(12) United States Patent
Coates et al.

(10) Patent No.: US 11,209,351 B2
(45) Date of Patent: Dec. 28, 2021

(54) INFERENTIAL FLUID CONDITION SENSOR AND METHOD THEREOF

(71) Applicant: ROAD DEUTSCHLAND GMBH, Bretten-Gölshausen (DE)

(72) Inventors: John Coates, Newton, CT (US); Matthias Richter, Neulingen (DE)

(73) Assignee: ROAD DEUTSCHLAND GMBH, Bretten-Gölshausen (DE)

( * ) Notice: Subject to any disclaimer, the term of this patent is extended or adjusted under 35 U.S.C. 154(b) by 0 days.

(21) Appl. No.: 16/612,612

(22) PCT Filed: Aug. 18, 2017

(86) PCT No.: PCT/US2017/047509
§ 371 (c)(1),
(2) Date: Nov. 11, 2019

(87) PCT Pub. No.: WO2018/208326
PCT Pub. Date: Nov. 15, 2018

(65) Prior Publication Data
US 2020/0200673 A1 Jun. 25, 2020

Related U.S. Application Data

(60) Provisional application No. 62/504,590, filed on May 11, 2017.

(51) Int. Cl.
*G01N 21/31* (2006.01)
*G01N 21/85* (2006.01)
*G01N 21/03* (2006.01)

(52) U.S. Cl.
CPC .............. *G01N 21/31* (2013.01); *G01N 21/85* (2013.01); *G01N 2021/3181* (2013.01); *G01N 2201/0624* (2013.01); *G01N 2201/0625* (2013.01); *G01N 2201/0627* (2013.01); *G01N 2201/1211* (2013.01)

(58) Field of Classification Search
CPC ... G01N 2021/3181; G01N 2021/8514; G01N 21/0303; G01N 21/31; G01N 21/85; G01N 2201/0621; G01N 2201/0624; G01N 2201/0625; G01N 2201/0627
See application file for complete search history.

(56) References Cited

U.S. PATENT DOCUMENTS

2016/0258877 A1* 9/2016 Hosani ................ G01N 21/532

* cited by examiner

*Primary Examiner* — Hina F Ayub
(74) *Attorney, Agent, or Firm* — Gutwein Law; Tyler B. Droste

(57) ABSTRACT

A sensor platform for the assessment of the condition and quality of fluids while in service is based on a combination of solid-state light sources (LEDs) and detectors housed within a single integrated package. The sensor platform configured to be standalone in operation and comprises interfacing optics and acquisition and processing electronics. The sensor platform is configured to obtain inputs from multiple stimulus points and correlates these to changes in the overall composition or condition of the fluid. The sensing method can be described as a combination of a differential sensor, by monitoring changes from the normal status of the fluid, and an inferential sensor where changes are interpreted in terms of global impact rather than specific localized changes in component concentration.

28 Claims, 26 Drawing Sheets

INFERENTIAL FLUID CONDITION SENSOR AND METHOD THEREOF

FIELD OF THE INVENTION

This invention relates generally to optical spectral sensors and associated spectral measurement systems. More particularly, it relates to optical sensors and fluid monitoring systems used in, for example, the heavy equipment, automotive and transportation industries.

BACKGROUND

The role of optical spectral measurements for the monitoring of static and dynamic fluid systems is well established in the field of analytical and process spectroscopy. Traditional systems involve the use of a spectrometric measurement system optically interfaced to a fluid stream, liquid, or gas. The standard format for such systems is some form of spectrometer or photometer with an integrated sample handling system. In the case of spectrometer systems, commercial dispersive near-infrared (NIR) or Fourier transform infrared (FTIR) both near- and mid-IR spectroscopy instruments featuring some form of flow cell are good examples. Flow cells can come in various forms for these types of applications, and can be used in transmission, transflectance (a combination of transmittance and reflectance) and internal reflectance formats. While the current disclosure can be extended to the mid-IR, the focus is primarily on the spectral range from the UV-visible to the near-infrared. The internal reflectance method mentioned above is not particularly useful in this spectral region, with the exception of the measurement of soot content in used diesel engine lubricants. This application is covered in the referenced issued U.S. Pat. No. 7,339,657 B2 which utilizes the internal reflectance mode of operation in the near infrared (at a nominal 940 nm).

In this current patent disclosure of the sensing technology the focus is on transmission and transflectance modes of sample interfacing. Transmission being used in a flow through configuration and the transflectance mode, which can include the incorporation of a retro-reflective optic, is used in an insertion probe configuration. In this form the optical interface, and the sensor can be bulkhead mounted.

Optical spectroscopy, in the form of infrared spectroscopy is a recognized technique for the analysis and characterization of all types of fluids used in industrial, automotive and transportation applications. This includes lubricants and functional fluids, in particular hydraulic transmission fluids, as used for vehicles and heavy equipment. Other forms of optical spectroscopy can be used and these include ultraviolet, visible, and near infrared.

Traditional oil/fluid condition monitoring is usually based on mid-infrared spectroscopy. Infrared spectral measurements are well understood, and FTIR methods are well established for laboratory-based oil analysis. Some miniaturization has been carried out on mid-IR spectroscopic instrumentation, and with this the technique has been transformed into a handheld/portable product measurement technology. These devices have been met with limited success because the high costs, and for some commercial systems standard laboratory FTIR systems are still less expensive.

Such spectroscopic measurements can provide meaningful data about the condition of the fluid and the fluid system during service. Traditionally, infrared spectroscopy includes both near infrared (NIR) and mid-infrared (mid-IR), and covers the region from 700 nm to 25,000 nm. Infrared spectroscopy, as defined above, can provide measurements of fluid condition and fluid characteristics such as aging/oxidation, water contamination, and the build-up of solid/decomposition/breakdown products, among other condition assessments. These condition measurements are derived by extraction of data from the spectrum using a measure of the chemical functionality from spectral features contained with the spectrum. UV and visible spectra include information derived from color and related electronic transitions from certain organic compounds. While this information may not be directly linked to the infrared molecular vibrations it can be cross-correlated to provide measurements of oxidation, moisture and additive contributions.

Furthermore, traditional infrared spectral region is definitive in terms of the measurement of materials as chemical entities. This measurement, however, can be impractical to implement in a low cost sensing system in terms of the materials used. By their nature, the optics and associated materials are relatively expensive and do not always lend themselves to easy replication and the production of inexpensive optical devices in large quantities. For this reason, it is appropriate to consider the role of alternative spectral regions, such as utilizing the near-infrared for the measurement of infrared related spectral data, and the UV-visible for other optical changes that result from a change in composition or fluid condition. Fabrication materials in these other spectral regions can be achieved at a lower cost, and are amenable to easy replication, including simple molding techniques.

The present invention of the current application bridges these spectral regions and combines the information primarily from the visible to the near-infrared, where changes in composition are determined by inference, not by the direct measurement of known spectral absorptions (as in mid-infrared). Current and previously discussed sensors and methods use a simple metric, such as a component or a contaminant concentration, which is measured and reported as a simple scalar value for a single contaminant. Previously, to sense a plurality of wavelengths additional individual sensors would be necessary for each particular contaminant. When multiple devices need to be implemented into a monitoring system, the systems can become larger and more complex, resulting in a more cost prohibitive system.

Additional factors also need to be of consideration including size, thermal stability, vibration immunity, spectral range, and cost. Alternative fluid measurement systems and techniques for fluid, gas, and vapor sensing and monitoring that address one or more of these considerations are desired. Therefore, alternative fluid measurement systems and techniques for fluid sensing and monitoring that can provide a low cost multi-dimensional approach to quality or fluid condition assessment are needed.

BRIEF SUMMARY OF THE INVENTION

In one aspect, this disclosure is related to a system for fluid measurement comprising at least one fluid sensor and at least one processing means communicatively coupled to the fluid sensor. The fluid sensor can include at least one integrated light source that is configured to produce at least one pre-determined wavelength of light intensity. The sensor can also include a detector system that comprises at least one detector element configured to detect and measure the at least one intensity of pre-determined wavelength spectrum of radiation transmitted through a fluid sample by the light source. The detector system can also include coupling apparatus configured to position the detector system and the integrated light source in relationship to each other. The processing means is configured to collect sets of measurement data from the fluid sensor and generate one or more vector outputs from the obtained sets of measurement data. The processing means can then process the vector outputs to assess the fluid condition of the fluid sample and then communicate the vector outputs and any fluid condition assessments to a user.

In another aspect, this disclosure is related to a system for fluid measurement that comprises a display, at least one fluid sensor, and a processing means. The components can be communicatively coupled to one another. The fluid sensor can comprise an integrated light, a detector system, and a coupling apparatus to position the light source and detector system. The integrated light source can be configured to produce at least one pre-determined wavelength of light intensity. The detector system can comprise at least one detector element configured to detect at least one pre-determined wavelength intensity of radiation transmitted through the sample by said light source. The processing means can be configured to collect a first set of measurement data and a second set of measurement data from the fluid sensor. The processing means can then generate a vector output using information from the first measurement data and second measurement data. The vector output can be compared to a look-up table. The processing means can then generate an alpha-numeric message to display. The processing means can control the display to generate the message to a user.

In another aspect, this disclosure is related to a dual optical path fluid monitoring sensor for measuring the quality of a sample, comprising an integrated light source configured to emit an optical beam. The sensor can further include an optical beam splitter configured to split the optical beam into a first optical beam on a first path and a second optical beam on a second path. A detector system can be included where the detector system has a first detector element configured to detect at least one pre-determined wavelength intensity from the first optical beam transmitted through the sample by said light source and a second detector element configured to detect at least one pre-determined wavelength intensity from the second optical beam transmitted through a reference sample by said light source. A coupling apparatus can be included and configured to position the detector system and integrated light source. An integrated electronics package can be communicatively coupled to the detector and light source. The electronics package can include a processor in communication with the sensor, the processor configured to calculate a value of the absorbance of the optical beam by the sample based on the detected pre-determined wavelength intensity. The electronics package can further include a memory configured to store the measurement data and vector outputs. The electronics package can be configured to determine a vector value indicative of the light absorbed by the sample, and output at least one vector value indicative of the transmission of light through the fluid via a comparison of the absorption of light of the sample and the absorption of the light of the reference sample.

In another aspect, this disclosure is related to a vector-based method of fluid condition assessment of a fluid sample comprising the steps of collecting set of measurement data from a fluid sensor or a reference fluid. The set of measurement data can be used to generate vector outputs. The vector outputs can then be compared to data references obtained from at least one of memorized historical vector outputs, look-up tables, and reference output vectors.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1A:
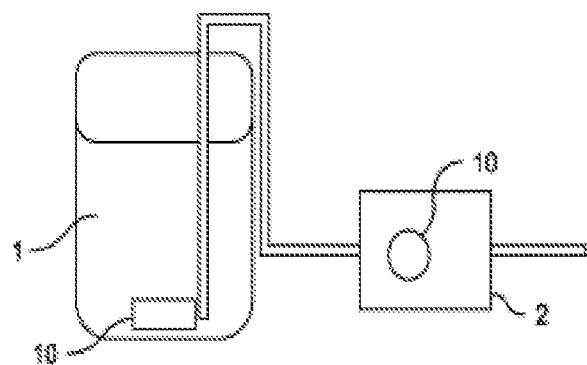
FIGS. 1A-1C are schematic diagrams illustrating an exemplary fluid monitoring system as implemented into a vehicle or heavy equipment application.

It is to be understood that the figures and descriptions of the present invention have been simplified to illustrate elements that are relevant for a clear understanding of the present invention, while eliminating, for purposes of clarity, many other elements found in fluid measuring systems, including those utilizing spectroscopy. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

The term "processor" or "processing means" when used herein generally refers to a circuit arrangement that may be contained on one or more silicon chips, and/or integrated circuit (IC) boards, and that contains at least one Central Processing Unit (CPU), and may contain multiple CPU's. The CPU may generally include an arithmetic logic unit (ALU), which performs arithmetic and logical operations, and a control unit, which extracts instructions from memory and decodes and executes them, calling on the ALU when necessary.

Processors may take the form of a microprocessor, and may be a low power CMOS processor with an embedded analog to digital ("A/D") converter, by way of non-limiting example only. The present invention is operable with computer storage products or computer readable media that contain program code for performing the various computer-implemented operations. The non-transitory computer-readable medium is any data storage device that can store data which can thereafter be read or accessed by a computer system component such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; solid-state storage devices and specially configured hardware devices such as field programmable gate arrays (FPGAs), application-specific integrated circuits (ASICs), programmable logic devices (PLDs), and ROM and RAM devices. Examples of program code include both machine code, as produced, for example, by a compiler, or files containing higher-level code that may be executed using an interpreter.

The term "electronics package" as used herein is to be understood broadly and includes any configuration of electronic components for use in providing power to components, such as light sources and detectors, control signals to such components, receiving data from such components, performing calculations and signal processing on data received from such components, storing received and processed data, and providing outputs of such data to monitoring and display systems. Such packages may include discrete analog and digital components, batteries, integrated circuits configured to include multiple analog and/or digital logic components, general purpose and special purpose processors, data storage devices of all descriptions including magnetic, capacitive, random access, read-only and other non-transitory storage media, wireless and wired transmitters, receivers, and transceivers, data buses, and other devices, in discrete and integrated form.

The detectors and emitters of all embodiments disclosed herein may be integrated into and integrally formed with electronic packages, such as on printed circuit boards such as control boards of such packages. Alternatively, the detectors and emitters may be configured to be mounted separately from control boards and other electronic devices.

In order to implement "infrared-based" oil condition monitoring, or at least functional equivalent, a different approach has to be used for both measurement and data assessment. As indicated under the background to this invention the optical components and the electro-optical subsystems for mid-IR are inherently expensive and so the construction of a spectral sensor for full fluid condition monitoring is not practical on a component or a cost basis. As a result, a unique alternative approach has been developed that makes use of the low cost materials available to the visible and near infrared spectral regions. The present invention approaches these challenges by taking advantage of the fact that the information contained within the mid-infrared spectrum is replicated, either directly or indirectly (by inference) throughout the entire electromagnetic absorption spectrum, even out as far as the ultraviolet spectral region. The information may be correlated based on the combined use of differential and inferential measurement techniques.

The sensor devices described in this patent disclosure are intended for use as monitoring devices for lubricants and functional fluids in automotive vehicles, heavy equipment, and various forms of transportation that involve dynamic fluid lubricant and power conversion systems. They include sensor devices for monitoring engine oils, transmission oils, hydraulic oils and fluids, turbine oils, coolants and any fluid system that protects mechanical moving parts or transmits power to moving parts.

A sensor system of the present invention is intended to be located within a moving stream or at a point in the fluid transfer system where there is a sufficiently frequent refreshment of the measurement zone during the measurement period. In one exemplary embodiment, the sensor can be operated immersed in the fluid, and measurements can be made in a static environment such as a tank or storage vessel. It is understood that the period of measurement can be extended from a few seconds to a few days for systems where the change in fluid composition (chemistry) changes slowly, if at all. When used for fluid quality or condition assessment the sensor is intended to monitor for changes in composition, including contamination from the use of an incorrect fluid.

The optical principles used for the measurements of the present invention are transmittance or optical transmission, with an optical path (pathlength) dependent on the fluid type and the specific physical or chemical functionality to be measured. Mid-infrared spectroscopy relies on light absorption resulting from molecular vibrations of the molecular structure of the material being measured, in this case the fluid or oil. The mid-infrared spectrum contains the absorptions ascribed to the fundamental vibrations of the molecules of the material, and these are traditionally observed at wavelengths from approximately 2500 nm to 25000 nm (2.5 micrometers to 25 micrometers/4000 cm-1 to 400 cm-1). However, because of deviations from ideal behavior, and because of interactions between molecules and associated "mechanical" and electronic influences of the molecular vibrations, it is possible to observe their contributions throughout the entire electromagnetic spectrum. In other words, energy transitions and associated absorptions indirectly linked to these fundamental vibrations can be measured in the UV, visible and in the near infrared spectrum.

Although the UV and visible spectrum of a molecule is attributed to electronic transitions within the molecule they are perturbed by the molecular vibrations. Additionally, the near-infrared spectrum of a molecule is formed from overtones of the fundamental vibrations, which can result in deviations from ideality. As a consequence, information contained within the visible and near-infrared spectral regions can be correlated to the mid-infrared spectrum and changes in the infrared spectrum can be derived by inference by monitoring the differential behavior of the spectral data. The present invention uses a spectral region selected for measurements between about 350 nm (UV) and about 1700 nm (NIR), with the visible spectrum included between about 400 nm and about 700 nm. The present invention does not exclude measurements outside of these ranges.

Figure 1C:
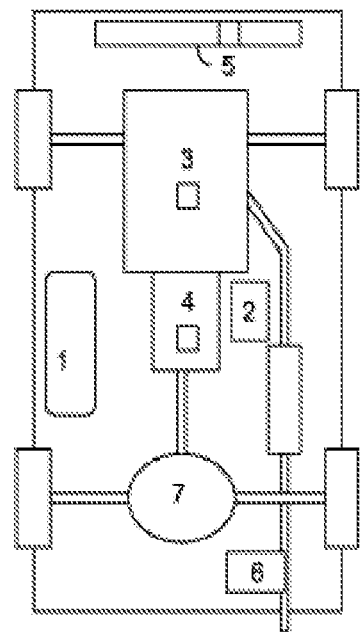
Figure 1B:
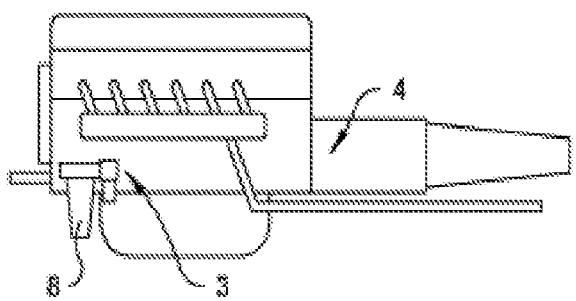

Referring generally to FIGS. 1A-1C, an exemplary fluid monitoring system is shown as implemented into an automotive or heavy equipment application. As set forth in this disclosure, sensors according to embodiments of the present invention may be suitable for fluid monitoring in all aspects of equipment operation. With reference to FIGS. 1A and 1C, for applications such as fuel quality monitoring, a sensor 10 may be located within a given fluid stream, such as in the feed lines or in a fluid dosing system 2. Further, a sensor may be configured as a submersible component located within a feed tank 1 (e.g. a fuel tank).

Referring generally to FIGS. 1B and 1C, sensors according to embodiments of the disclosure may also be used for oil condition monitoring (e.g. oxidation and nitration) in gasoline and natural fired engines. For this application, sensing devices may be located at the output side of an engine's 3 primary (or secondary) filtration system, where a filter 8 can be inserted into the stream on the return side of the filter-housing block. Advantages of mounting the sensor on the filter block include convenient access, external mounting, and reduced operating temperature. Alternative positions for the sensors described herein may include the transmission 4, the coolant system 5 and the rear axle 7. The sensors of the present invention can be used for any form of fluid measurement system, and is not intended to be limited to vehicle or engine systems.

Figure 2B:
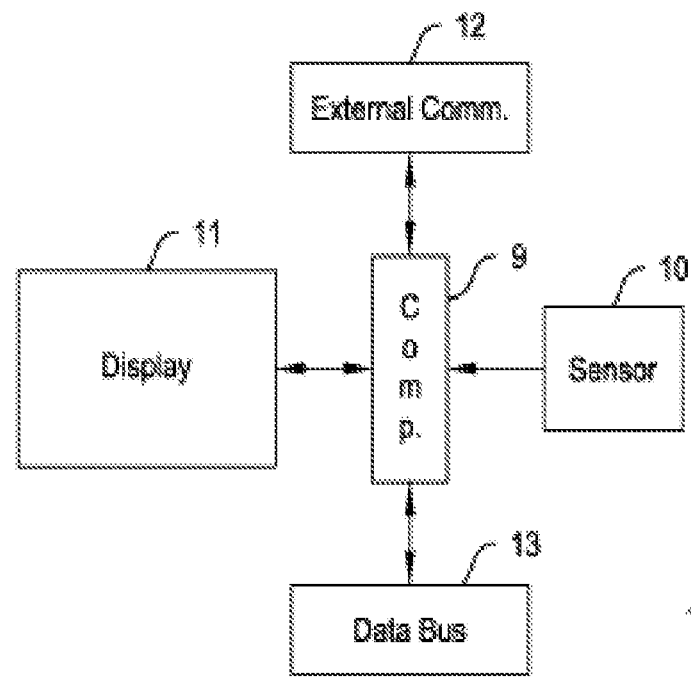
FIGS. 2A and 2B are schematic diagrams illustrating exemplary methods of integrating the fluid sensor system according to exemplary embodiments of the present disclosure.
Figure 2A:
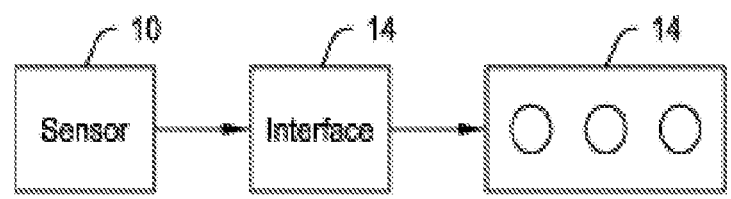

The system will now be described in terms of the main functional components, the opto-electronic devices. Two key components that form the basis of the solid-state spectral measurement system of the present invention, are the light emitting diodes (LEDs), which are used as spectrally selective sources, and the solid-state detectors. These components can be further integrated with opto-electronics and controlling systems. Referencing FIGS. 2A and 2B, with one or more sensors on a vehicle or other piece of equipment, measured data can be provided to a display or on-board data handling system. In one exemplary embodiment, the present invention may communicate sensory data back to an operator or driver via an alert or display. Referring to FIG. 2A, in one implementation, a standalone system 20 includes a functional display and associated interface hardware 14 directly responsive to the output of a sensor 10 for communicating data to an operator.

This type of interface may be advantageously implemented as a retrofit to an existing vehicle or piece of equipment. With reference to FIG. 2B, in other embodiments, however, the measurement systems may be more fully incorporated into the vehicle's original equipment (OE) control/computer systems. For example, the output of one or more sensors 10 may be provided to the vehicle's management system, including an on-board computer or data management processor, such as a CPU 9. The CPU can include a processing means 127, a memory 129, and an A/D converter 131. From this management system, sensory output data may be provided to, for example, an operator display 11, an external communication device 12 (e.g. a transmitter for communicating with a remote monitoring system), or stored into memory via an electronics package 13 for further processing or retrieval. It should be appreciated that sensors 10 may receive power provided by electronics package 13 or through the normal power distribution system of the vehicle. The memory can store data used in assessing fluid condition, including but not limited to, historical vector outputs, look-up tables, and reference output vectors. The data can then be used and compared to vector outputs generated from measurement data collected from the fluid sensor, the reference fluid, or both. The system can use additional sensors 10 to monitor other aspects of the fluid, including but not limited to the temperature of the fluid. This sensor can be independent or incorporated into the optical sensor 10 of the present disclosure.

In one exemplary embodiment, the solid-state detectors can be a silicon photodiode detector. Silicon photodiode detectors have the advantages of high sensitivity over a broad spectral region (nominally 350 nm to 1100 nm), linearity, robustness, and availability of a large number of packaging options, and at extremely low cost. The system can also include other types of detector for the target measurement range, such as an InGaAs detector to extend the measurement range to about 1700 nm. In practice, extended versions of InGaAs detectors are available, and are capable of providing detection out to 2600 nm. These are expensive to implement because they typically require cooling to provide optimal performance, however, the present invention does not require such extensions. Additionally, the photo diode detector could also use black silicon. In one exemplary embodiment, the light source can produce light in the spectral region from about 250 nm to about 2500 nm.

The detectors, either singly or in pairs (Si plus InGaAs), can monitor the output from the LEDs either sequentially (temporally) or simultaneously. If measured sequentially the LEDs can be modulated at a fixed frequency, and if measured simultaneously the individual wavelengths are differentiated based on modulation frequency. In one exemplary embodiment, a multiple channel configuration can provide wavelength profiling to generate a low resolution facsimile of a spectrum output, providing a practical sensor with functionality mid-way between a single point sensor (traditional) and a scanning spectrometer. Additionally, custom LED packages featuring multiple LEDs can be used.

In one exemplary embodiment, the system can be comprised of multiple LEDs, which can be individually modulated and controlled, and coupled to an electronic or an optical feedback system for monitoring the outputs of the LEDs. In the case of the electronic feedback the voltage/current to the LEDs is regulated and monitored for changes over time. This requires the electrical and thermal characteristics of the LEDs to be modeled and to provide real-time corrections to the LED/detector responses. In the case of the optical feedback system an optional optical reference channel is implemented. These systems can be incorporated to compensate for drift in the output of the LEDs as a function of temperature by monitoring the electronics temperature. Similarly, the fluid temperature can be monitored and is used to provide logistic feedback for spectral responses that change with temperature.

It is expected that the optical and electronics system may be a single integrated circuit board or device, which can be an application specific integrated circuits (ASICs) for the signal handling, computations and data communications. It is expected that this integrated opto-electronic component may be encapsulated, and may possibly include some imaging optics, accomplished by some form of molded optics in front of the source(s) and detector(s).

A user can obtain significant benefits by taking advantage of the correlated relationship between the different spectral regions. One of the first has already been mentioned and that is the optical components used to generate, capture, direct and detect the spectral changes in the materials under study, such as fluids, which allows for significantly less expense than the special materials and components required to make an infrared measurement.

The transparent materials used for windows and lenses can be made of low cost glass, fused silica or plastic, which are easy to fabricate and very low in cost. Other materials such as glasses and engineering polymers, can be used, which may be replicated by casting and/or machining. Examples of suitable plastics and polymers include polycarbonates, polyacrylics, polyethers, polyolefins and polysulfones.

The light sources for the spectral measurements can be any suitable light source, such as LEDs. The photon detectors used for this region are readily available and at a relatively low cost. The benefits associated with the use of LEDs, in addition of cost, are they are low power devices, which are commercially available covering the target range of defined wavelengths, and can be modulated at relatively high frequencies. Additionally, LEDs remove the need for spectral dispersion optics and components used in conventional spectrometers. These benefits lead to significant size reduction, mechanical simplicity, ease of packaging and optical design and simplified electronics.

Figure 3A:
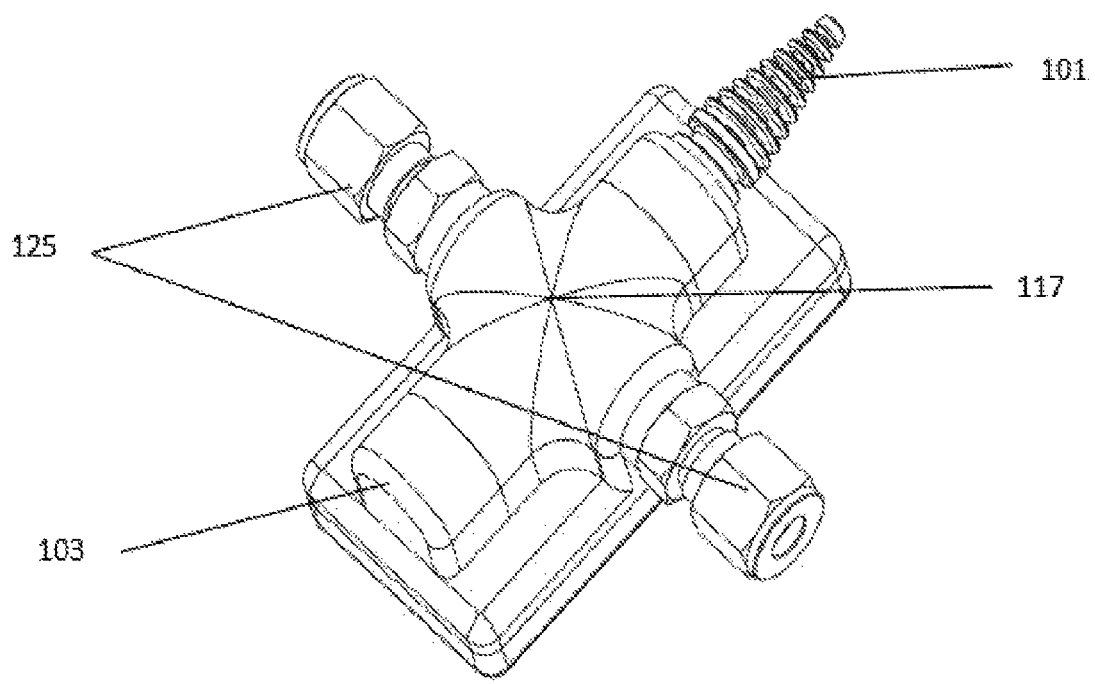
FIG. 3A is a perspective view of exemplary embodiments of a flow through liquid sensor of the present invention.
Figure 3B:
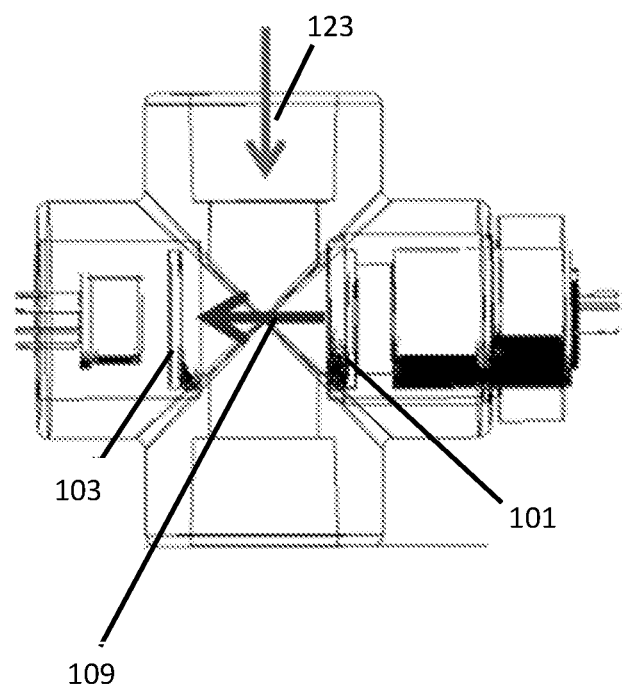
FIG. 3B is an illustration of an exemplary embodiment of a sensor of the present invention having a single optical path.

The measurement of the fluid condition are made with light transmission in a flowing system with either a cross transmission flow cell (FIGS. 3A-3D) or with an insertion probe. As shown in FIG. 3A, an in-line flow through sensor that can be optimized for the various wavelength applications where a path length is selected to be suitable to the particular application. This sensor can include connectors 125 in communication with chamber for interfacing with a fluid feed path (e.g. a fuel line). This complete package can include a close coupled electronics interface and can have multiple channels available for the monitoring of about 4 to about 20 independent wavelengths. This smaller path length can allow the sensor to be packaged even smaller and requires a smaller sample size that can aid in preventing environmental factors, such as freezing, from affecting the sample.

The sensor can use any suitable coupling 125, such as a standard Swagelok®, Circor® or Parker® style compression coupling, which can be attached to an inner chamber 117 and fitted with sealed windows. The sealed windows can use any suitable material, such as quartz, sapphire, barium or calcium fluoride. The light source 101 and detector 103 can be juxtaposed to optimize optical coupling. Additionally, the electronics can be close-coupled to reduce connector wire lengths and minimize signal pickup. The entire package is optimized for size and optical/pneumatic efficiency for gas, vapor, or liquid measurements.

As noted earlier in the description of the basic optical measurement the transmission of light through the sample is typically made on relative basis where the light transmission through the fluid is compared to a reference, where the reference is either the transmission through the measurement cavity (or cell) in the absence of the fluid, or the measured transmission through the original fresh fluid. In one exemplary embodiment, the processing means compares the set of measurement data of the sample fluid to the set of measurement data of a reference fluid. In this last case, the transmission through the fluid is measured at the different LED wavelengths and the acquired signals are stored. This enables the measurement of the differential vector to be calculated. The differential vector is defined as the measured used fluid vector divided by the unused or fresh fluid vector and presented in the absorbance data format.

Figure 3C:
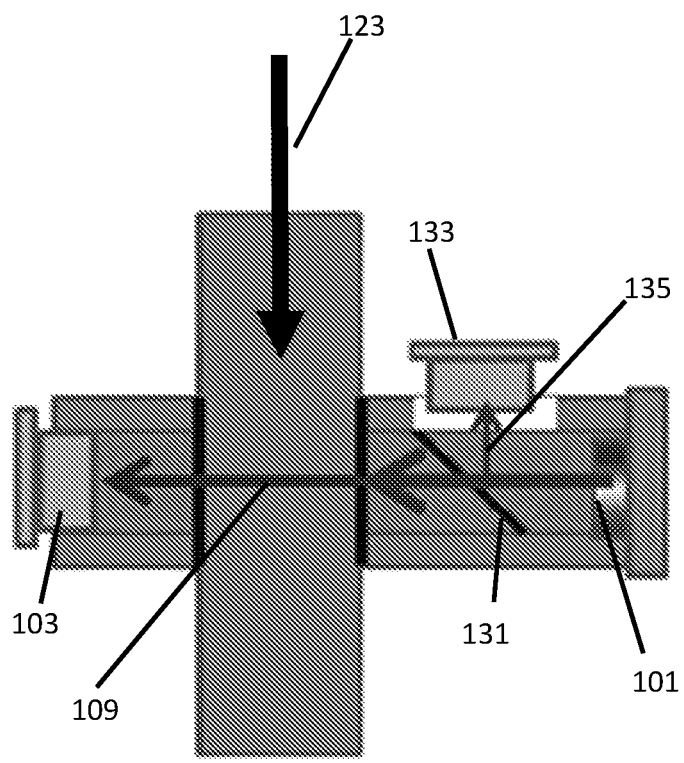
FIG. 3C is an illustration of an exemplary embodiment of a sensor of the present invention having a dual optical path.
Figure 3D:
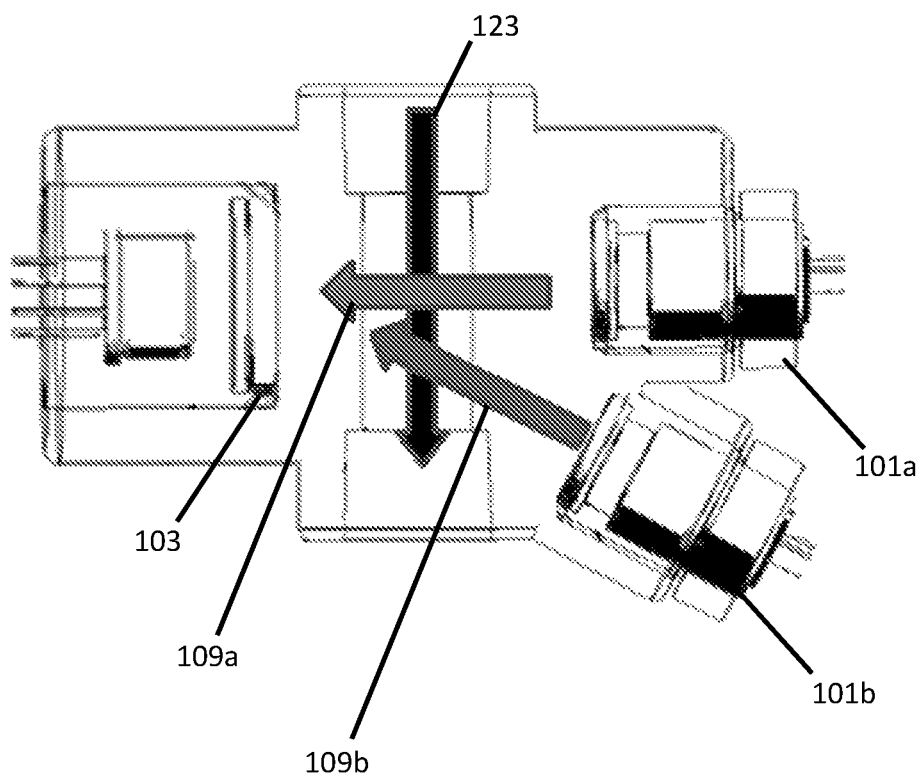
FIG. 3D is an illustration of an exemplary embodiment of a sensor of the present invention having dual light sources at different angles.
Figure 4:
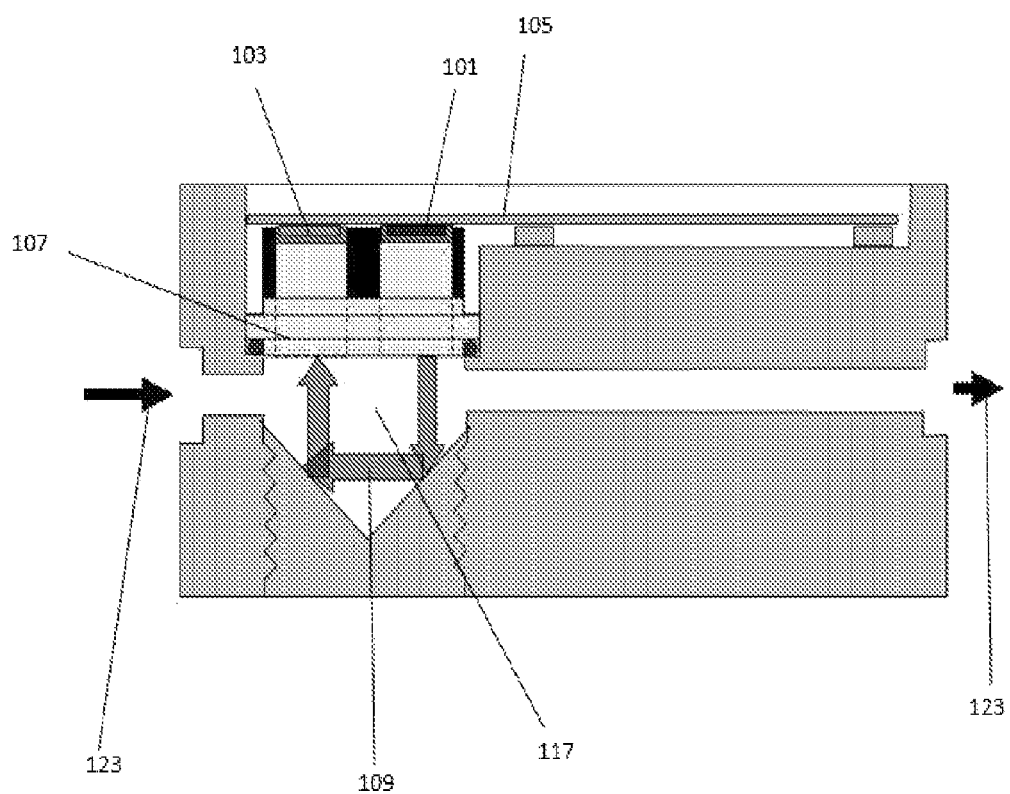
FIG. 4 is an illustration of an exemplary embodiment of an optical sensor and electronics of the present invention.

For example, FIG. 4 is a cross-sectional view illustrating an in-line (flow-through) sensor with an adjustable retro-reflective insert, and an electronics package/opto-board 105 including at least one light source 101 and at least one detector 103. This interchangeable insert may be used for fine adjustment of the optical path length 109, or reflector type, without the need to replace the entire sensor package. As illustrated, energy from light source 101, can comprise a plurality of LEDs emitting multiple wavelengths, passes through the fluid in the chamber 117 and back to detector 103 along the path shown 109 in FIG. 4. The transmitted energy, which can include deep UV to the upper limits of the infrared spectrum interacts with the sample fluid, with the characteristic absorptions of the fluid modifying the light transmission of the fluid, and is subsequently sensed by a detector system, having at least one detector 103. The in-line flow through sensor allows a fluid to flow through the sensor and measurement chamber while the sensor is in operation. The fluid path 123 is illustrated in FIG. 4 and flows through a first end of the sensor through to a second end of the sensor. The selectivity of the absorption can be defined by the various LED light sources 101 integrated with the detector 103 of the detector system. The detector system can include a single detector or a plurality of detectors each with or without an optical filter for different wavelengths. This detector system can be implemented in various embodiments, including but not limited to those of shown illustrated in FIGS. 3A-3D and FIG. 4.

While this is a practical method of measurement it does rely on the output of the LEDs to be maintained at a constant level. This can be carried out by either electronic control of the voltage/current to the LEDs, with suitable a regulation and feedback circuit, or by optically monitoring the output of the LED independent of the sample fluid. This can be accomplished by adding a second optical path 135 to the reference detector 133 of the measurement system thereby providing a real-time reference channel. In one exemplary embodiment shown in FIG. 3C, the optical beam from the LED sources 101 can be split into two or more separate paths by an optical beam splitter 131. Suitable beam splitters 131 for the spectral measurement range can be implemented by insertion in about a 45° configuration into the LED beam path thereby providing a second separate and independent measurement path. This second path 135 includes a second detector 133 package as indicated in FIG. 3C. The split ratio does not have to be 1:1 as a standard beam splitter but can be set at 20:80 (20% reference: 80% fluid). Electronic adjustments can be made to normalize the two signals for each LED wavelength. An alternative to a custom beam splitter 133 can use any high index material, such as Cleartran or zinc selenide, where light losses due to reflection may be in the range of about 20% or higher provide the required level of beam splitting in about a 45° configuration. The splitter 131 in other exemplary embodiments can be configured and be positioned to monitor fluid samples under different optical angles, such as between about 10° or about 170°, or about 30° to about 130°, or about 45° to about 90°. Similarly, as illustrated in FIG. 3D, some embodiments can have a plurality of light sources 101a,b that can be positioned to monitor the fluid under two or more different angles through the sample path. This can allow for two separate optical path lengths 109a,b that pass to the fluid sample and to the detector 103. In one exemplary embodiment, the reference beam 135 does not pass through a fluid sample. The below equations can be used in determining the differential transmittance of a fluid.

Stored Optical Reference: Transmittance=$I_{measured}/I_{stored}$   Equation 1:

Where $I_{measured}$ and $I_{stored}$ are the recorded detector signals.

Real-time Optical Reference: Transmittance=$I_{sample}/I_{reference}$   Equation 2:

When operating in the differential mode the real-time reference can provide real-time generation of the transmittance form of the data, and a stored reference is still required to measure the differential absorbance.

The detector electronics can further include an analog-to-digital (A/D) converter sufficient to cover the dynamic range of the measurement. The optical response values are computed for each LED channel and these are stored and compared to the output for the fresh fluid obtained at the time that the charge of fresh fluid is introduced into the hydraulic/lubrication system. The first data collection is the original data (defined as "Original") in the light transmission or transmittance format. This can be stored for the current fluid data collection in a data array 1×n, where n=number of LED wavelengths. This and the stored reference for the fresh/unused fluid are ratioed and converted to the absorbance format to produce the final differential absorbance vector (defined as "Differential"). "Original" and "Differential" can be used to describe the two stored vectors obtained for each cycle of the measurement.

As a functional piece of hardware the sensor is a low-power consumption device internally operating at about 3.5 to about 5 volts, with the ability to handle input voltages normally found on vehicles and ranging from about 12 to about 40 Volts DC. The device can be configured with various electronics packages, from a simple digital output device to a smart sensor that provides processed numerical data. The vector output described above is ideal for providing the logic and intelligence needed to enable the smart sensor function.

The present invention can use various types of energy sources (emitters), including but not limited to LEDs. Exemplary embodiments of the present invention can use LEDs as light sources. The use of LEDS can enable the monitoring devices to be designed that can operate from the UV spectrum (currently 350 nm), through the visible and out to the mid-near infrared spectrum (typically, but not exclusively, <1700 nm). The present invention can further be extended to optical ranges down to the deep UV (<240 nm) and to the far-near-infrared and mid-infrared (out to 25,000 nm/25 μm) is included. These ranges can currently be achieved, but can be more costly and less reliable. As UV and mid-IR LEDs become more widespread their inclusion in solid state sensors can become more practical.

Various implementations intended for this current disclosure the focus is on the use of multiple LEDs, typically greater than six but ideally less than twenty, based on size limitations. The trade in this case is between the physical spaces occupied by multiple LEDs and the number of LEDs required to record the spectral information for an accurate measurement. Useful combinations considered here are seven LEDs mounted in a 6 around 1 configuration, nine LEDs mounted in a triangular configuration with three SMT multicolor packages, and sixteen LEDs mounted as bare dies on a custom circuit board. Note that these three configurations are included as practical examples, other configurations can be used and are not excluded in this disclosure.

LEDs offer the advantages of color or wavelength specificity, constant output, low power consumption, no significant thermal output, the device output can be modulated at unique frequencies, compactness and robustness, availability in a large number of packaging options, and extremely low cost. A relatively wide range of spectral wavelengths is available for LED sources from 240 nm (far UV) to 3000 nm (mid-IR). Longer wavelengths are becoming available and are included here for reference for future applications.

Another benefit provided by certain LEDs is the ability to operate at two or more states producing more than one wavelength (such as red, yellow and green) from a single device. This enables a very compact design using a single source and single detector, and where the output for individual wavelengths is differentiated by different modulation frequencies. In the current measurement system multiple LEDs are used providing an array of wavelengths spanning the range from 350 nm to 1700 nm. A physical array of LED devices can be assembled as individual assemblies, as composite assemblies (multiple dies in one package) or as custom designed arrays with multiple dies on a custom electronics assembly.

Output data from the sensor with formatting can either go directly to a display, such as a simple status light, for example, a three state LED: green (OK), yellow (warning) and red (alert or problem); or to an alpha-numeric or a graphical display, for example, an LCD display. The scalar output can be used as input for a three state logic, and the vector output coupled to a look-up table can provide descriptive messaging for an alpha-numeric display. Alternatively, the sensor can provide a standardized format output (such as SAE J1939) to a vehicle or equipment data bus, such as the CAN bus (such as a 5V-Highspeed-CAN, 250 kbit, ISO11898) of a vehicle, supplying diagnostic data (on board diagnostics, OBD) either to an on-board computer, which in turn supports an intelligent sensor output display. It is anticipated that the vector output can be configured into a format to support a registered CAN message format. The message can be based on one or more vector outputs and can be in a form that can be transmitted to a display and displayed on a display to a user. Similarly, the message can be transmitted to a user via another external communications device.

The optical interfacing is based on optical transmission and this is accomplished by either direct line of sight coupling of the source(s) and detector(s) (staring mode) as illustrated in FIGS. 3A-D or by a transflectance configuration in FIG. 4. In the transflectance mode, the radiation from the source(s) passes through the fluid to a reflecting optic, and the beam is then returned along a different path to interact with the detector(s). In the staring mode the source(s) and detector(s) are placed opposite each other, and in the transflectance mode they may be placed side by side. The transflectance mode can be more convenient to use both in regard to packaging and for electronic interfacing. However, it is more complex to implement, and for some implementations added complexity correlates to increased cost.

The use of the system in operational temperature range may exhibit temperature sensitivity that can result in inaccuracies in the calculated values. These inaccuracies can be modeled by observing the responses of the sensor with different temperature settings for the sensor and the fluid, and a series of response curves can be derived. Mathematical fitting allows these functions to be reproducible and are easily fitted to a simple polynomial function.

The placement of the opto-electronic elements is important to ensure optimum imaging through the optical interfacing structure. In a standard environment, with moderate operating temperatures, the opto-electronics can be close-coupled to the optical interfacing structure. Typical distances are expected to be of the order of about a few millimeters to about a few centimeters at most. At the shorter distances, no additional imaging optics are contemplated. At the longer distances a supplemental lens, which can be made from glass or plastic, in front of the LED source(s) and detector(s) may be used to improve optical throughput. Alternatives can include the use of light conduit, from the optical interfacing structure to the opto-electronics, including both the source(s) and the detector(s). Light conduit can be in the form of glass or plastic rod (index matched or otherwise) or optical fibers.

FIG. 3A is an example concept flow cell configuration designed for inline monitoring, with or without a secondary reference channel 135 (shown in FIG. 3C). This illustration shows close integration of the flow cell with the electronics where the complete sensor or packaged with the detector pre-amplifiers, the A/D converters, the on board processor, and the communications interface is shown. Any suitable interface can be used, such as a serial interface (RS232 or CAN). The complete package can be environmentally sealed, and if necessarily potted to provide total protection to the optics and electronics.

Figure 5:
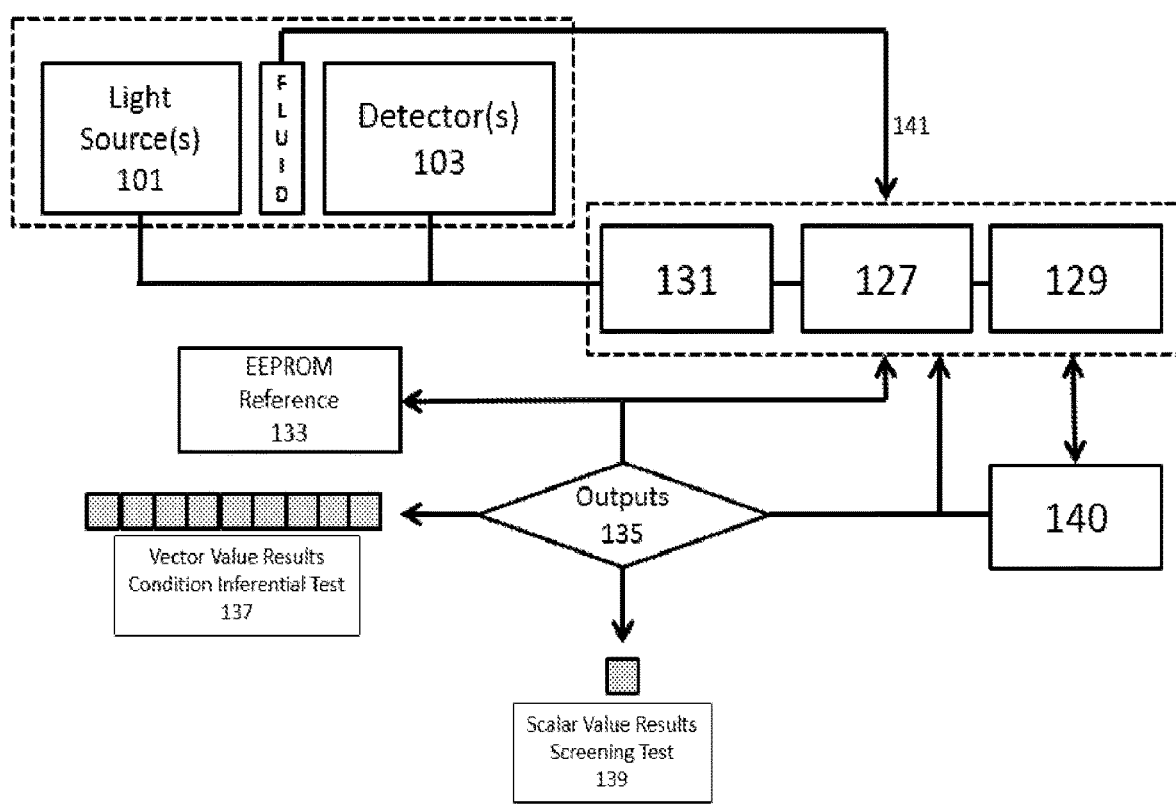
FIG. 5 is a logic block diagram of an inferential determination of fluid condition assessment of the present invention.

FIG. 5 is a schematic of the measurement and inferential signal collection logic of the present disclosure for a fluid sample 102 by the opto-electric sensor 10. The sensor 10 can be communicatively coupled to the computer 9 and the LEDs or alternative light source 101 can be modulated either as a fixed frequency or different unique frequencies for each wavelength. Each set of measurement data involves collection of the detector(s) 103 response within a data block and communicated back to the computer 9, where all readout values are logged into a data array, which can be stored on a memory 129. The data array set has the dimensions 1×n, where n is the number of LED wavelengths. An A/D converter 131 can provide A/D conversion of the output signal which is scaled to prevent saturation. For 12-bit A/D the scaling is set to values of <4000. When first installed reference signatures of the LED package 101 can be recorded, initially in the absence of fluid, and then when a new "fresh fluid charge" is installed. Both sets of data are stored in permanent (EEPROM) memory 133 for future recall. The EEPROM can be separate from the computer 9, such as on a server remote from the computer, or can be included with the computer memory 129. Additionally, the computer 9 and outputs 135 can be in communication with other various communications means 140, such as servers, other computers, other devices and sensors, and external memory. The communications means 140 can be used or consulted for vector and status judgments to be carried out, determined, or both. The outputs can be communicated back to both the computer 9 and communications means 140 simultaneously.

In operation each data array set is recorded and compared in real time to the pre-recorded stored reference vectors for both the empty optical cell and the "fresh fluid charge". This reference data can include stored historical vector outputs, look-up tables, and reference output vectors, and other related data used to generate one or more outputs 135. This generates the real-time transmittance and differential absorbance vectors 137 that are used to evaluate the condition of the fluid. Additionally, an integrated scalar value 139 is also calculated and this can be used to trigger a real-time warning of a poor fluid condition. This output data or outputs 135 can be communicated back to the computer 9 and transmitted to a user via an external communication device 12 or user interface, such as a display 11. The output data can additionally be stored in the memory 129. The memory 129 can be configured to store one, multiple, or continuously generated output vectors of the measurements taken by the sensor 10. In one exemplary embodiment, the output vector values are indicative of the light absorbed by the fluid or sample 102. Additional data, such as environmental data (i.e. temperature) can be transmitted to the computer 9, in addition to the spectral measurement data. The sets of measurements of the data obtained by the sensor can be formed by at least one absolute absorbance measurement, differential absorbance measurement, or both.

If a fluid is just changing as a function of normal aging then only channels (array indices) 2 to 5 for the differential absorbance vector will register a change, and for acceptable condition this should have a value of <1000. Channels/indices 6 to 9 should show little or no change if the condition is good. Changes in channels 6 to 9 can indicate build-up of particulates and/or water. Values that change gradually and are higher in value for channels 6 and 7 may indicate particulates rather than water. High values for channels 6 to 9 indicate poor quality or even severe fluid degradation. If values for channels 6 to 9 show temperature sensitivity, decreasing with increase in temperature, then finely dispersed water, just above trace levels is indicated. These are examples of inferential condition monitoring vector values recorded from a differential sensor measurement. The comparison of vector outputs to data references can produce output vectors that can be used in comparison with the measurements to generate data indicative of changes from the reference data to the set measurements from the fluid sample or from the different fluid data measurements obtained by the sensor. This change data can be used to indicate the fluid condition of the fluid sample. Additionally, other change data, such a weighted vector output changes, speed of change in the change data, at the pattern of change in the change data can be used to indicate and/or determine the fluid condition of a fluid sample. Further assessments of fluids using the present invention are discussed below.

The present invention provides a multi-dimensional approach to quality or fluid condition assessment. While the sensor output can include an estimation of material or component concentrations, if required, it actually provides an assessment of overall condition, which can include changes that result from environmental or operational impact on the fluid. It provides an output in a differential mode where only changes in fluid composition or quality are monitored. Such changes include aging (oxidation and/or thermal degradation), the appearance of insoluble materials linked to over-stressing and/or chemical decomposition of the fluid while in service, the appearance of insoluble materials linked to mechanical component wear, and the detection of the impact of contamination by other fluids, including the ingress of water.

As described above, the system of the present invention measures optical and spectral changes in the fluid and these are determined at multiple sensing wavelengths by measuring the response of sensing electronics (detectors) at specific wavelengths as defined by an array of synchronized LEDs. Unlike a single function sensor, this inferential sensor uses the complete integrated output from all the sensing elements and is evaluated on a vector basis, with a data array, rather than from a single output of a numerical/scalar value. In simple terms the sensor defines a total evaluation of fluid condition/quality, and this can be expressed in evaluative terms such as "slight degradation continue to use", "moderate levels of material contamination . . . recommend fluid inspection", to "severe . . . recommend removal and replacement", rather than a single numerical value for oxidation or water content, which requires interpretation. These descriptive fluid condition outputs can be provided from a look-up table cross-referenced to the vector values generated by the multi-sensing detector output from the synchronized LEDs.

One of the benefits of this vector based approach is the sensitivity to changes in fluid composition, and the multiple spectral points that are used to determine a net overall change in the fluid condition. This system does not require the sensor to be calibrated, or a calibration data set to be referenced in order to provide meaningful results. The changes in vector response are predictable for different failure modes of the fluid including excessive aging, excessive degradation, and the formation of insoluble/particles and the introduction of water as a contaminant.

Experimental Data

Figure 6A:
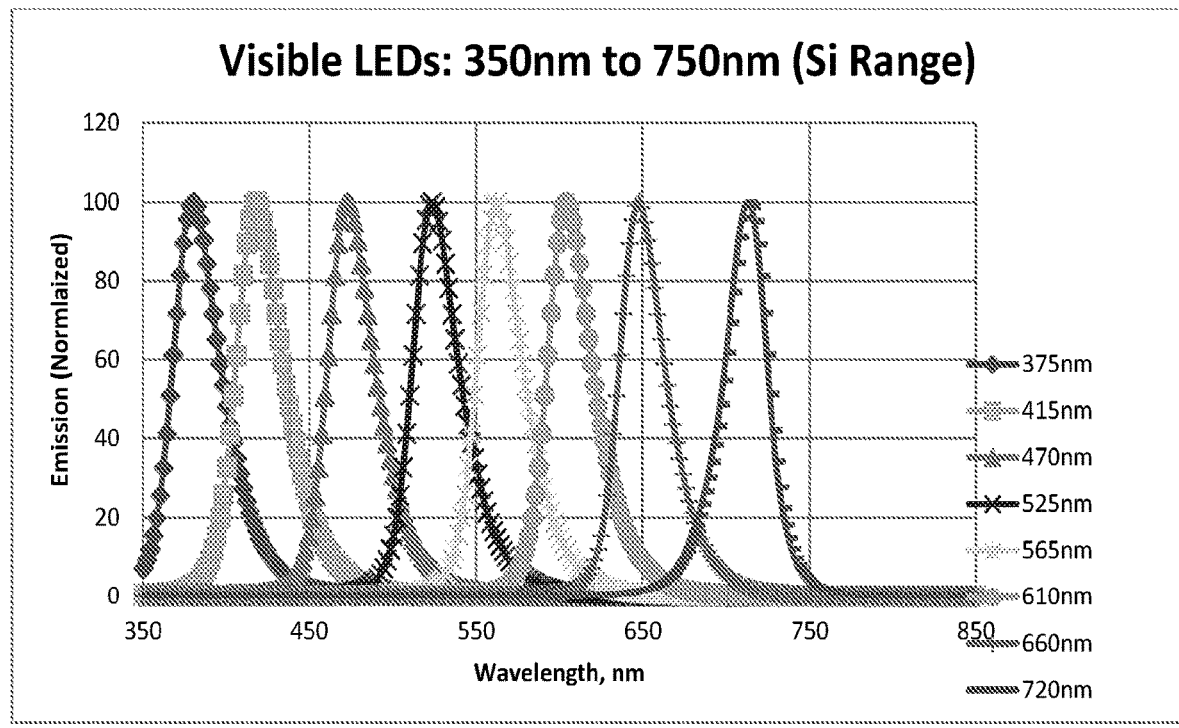
FIG. 6A-D are graphical representations of the wavelengths of current commercially available LEDs.
Figure 6B:
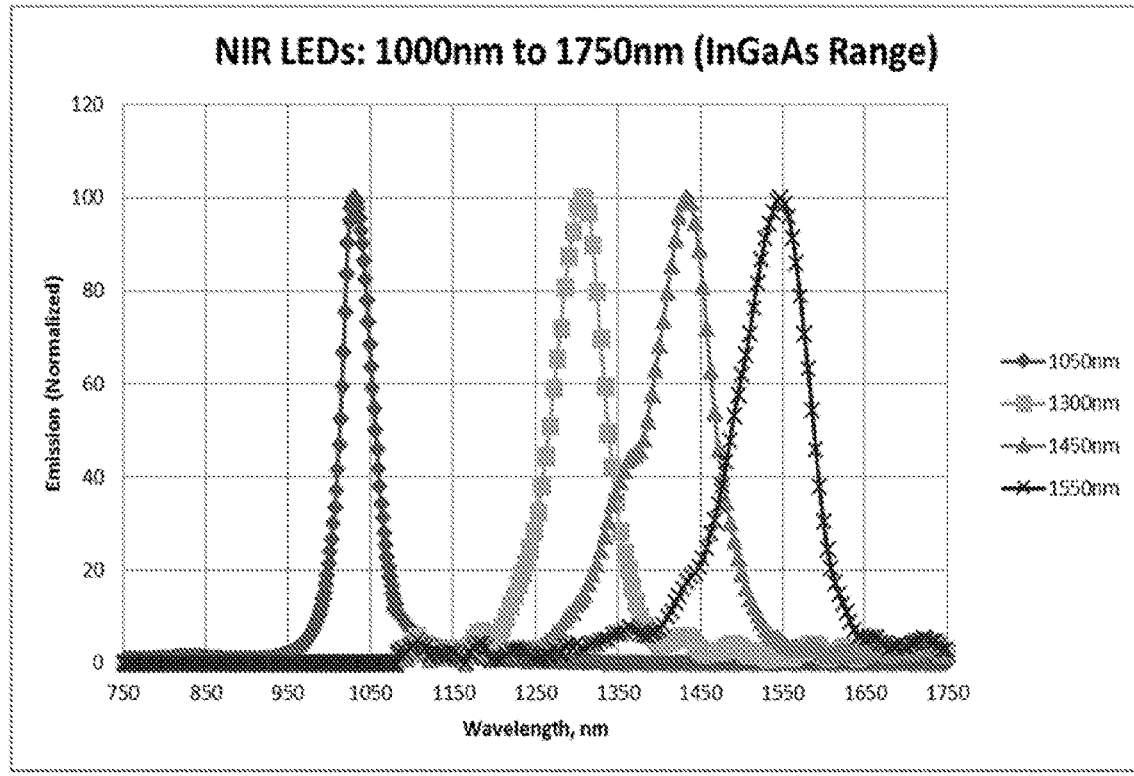
Figure 6C:
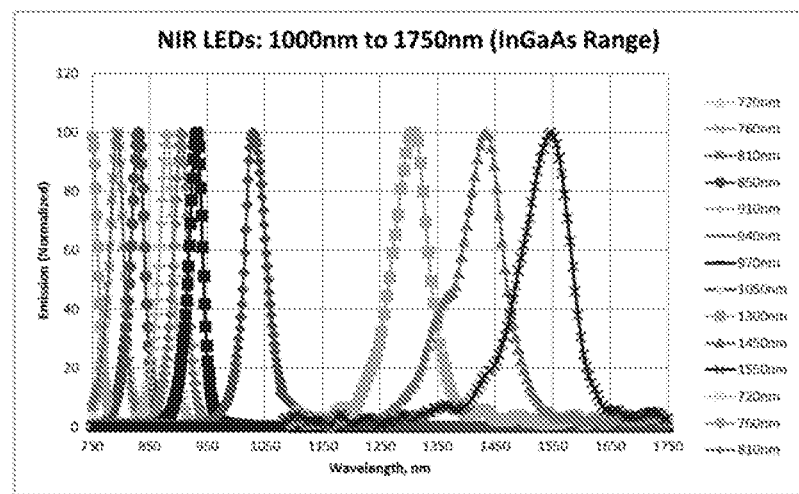
Figure 6D:
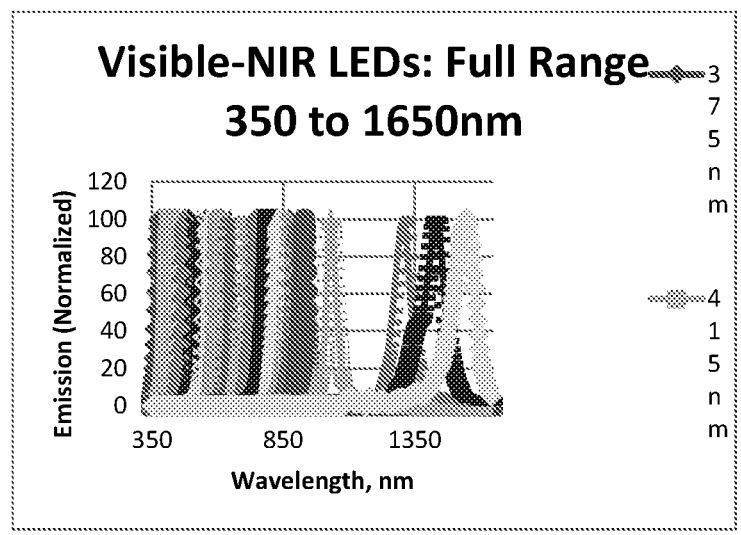

FIGS. 6A-6D present standard commercial LEDs differentiated by wavelength covering the range of 350 nm to 1700 nm, which is the spectral region chosen for the inferential measurements of the present invention. These start at the UV-visible (FIG. 6A), transition through the short-wave NIR (FIG. 6B), and finish in the NIR (FIG. 6C). The wavelengths/LEDs currently under consideration are summarized in FIG. 6D. From a diagnostic perspective relative to used fluid condition, the visible and the shortwave NIR track oxidation and nitro-oxidation, and various forms of contamination, including the top-off by incorrect fluids. The NIR provides additional information relative to the fluid itself such as mixing with other fluid types, contamination by water and other non-compatible fluids, and material breakdown, leading to the formation of insoluble materials and particulates.

Figure 7A:
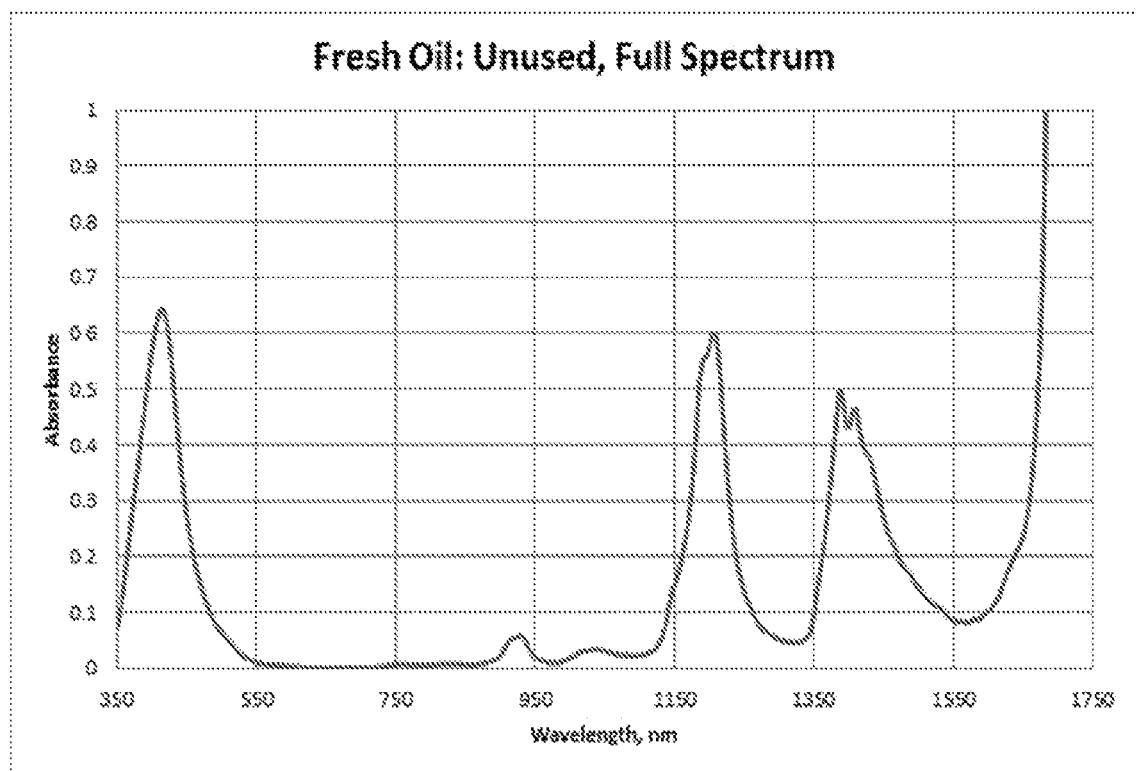
FIG. 7A is a graphical spectral representation of a spectrometer measurement of the full spectrum of unused oil.
Figure 7B:
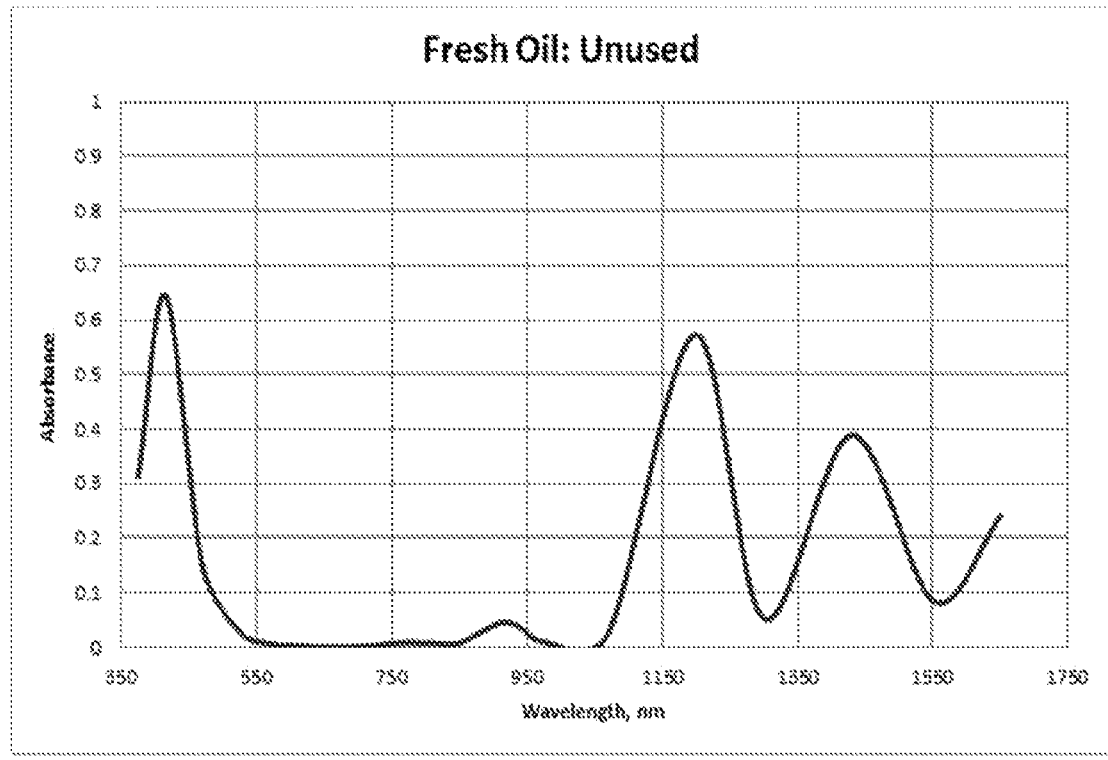
FIG. 7B is a graphical spectral representation of a 16 channel sensor emulation of the present invention.

A sixteen LED light source configuration has the benefit of providing a reasonable facsimile of a low resolution spectrum, as obtained from scanning spectrometer. FIGS. 7A-D provide an example spectrum of a representative unused fresh oil (FIG. 7A) recorded on a laboratory research-grade UV-visible-NIR spectrometer with a nominal 8 nm to 12 nm spectral resolution. There is a higher density of LED wavelengths available in the visible spectral range and so a near comparable spectral emulation can be obtained from the LED-based spectral measurements (FIG. 7B). There can be less NIR LEDs available that can result in the spectral emulation in this area that can provide a lower spectral resolution result. If the sensor is used in a purely comparative mode, or in a differential mode, as it is implemented as a spectral sensor, then this lower resolution is of little or no consequence. The spectral representation shown is generated by a cubic spline interpolation of the about 16 wavelength points obtained from the about 16 wavelength LED array. As illustrated, the LED-based spectral sensor can duplicate the functionality of a scanning spectrometer, but in a practical, compact and rugged on-line or in-line implementation, with cost of such a system a system price of under about $100 is possible.

From an optical implementation aspect the interfacing of the optics to the mechanical fluidic system can also be simplified as result of the selected wavelength range providing an ideal optical pathlength through the fluid which can be within the range of about 2 mm to about 20 mm (even up to about 50 mm for special applications), enabling standard internal diameters to be used for the fluid flow or fluid transfer to the sensing system. This provides a great advantage over mid infrared spectral measurements where the practical range for optical pathlengths is between about 0.025 mm and about 0.2 mm. When using the present invention for standard mineral oils and synthetic lubricants, the ideal optical path is about 10 mm. For other applications that feature water-based measurements and/or samples with a high degree of normal color or measurements involving high levels of particulates of light scattering components pathlengths down to about 1 mm to about 2 mm may be beneficial. Alternatively, applications that focus on the shortwave NIR, between about 700 nm to about 1050 nm may benefit by the use of longer optical paths, out beyond about 20 mm to possibly as long as about 50 mm. These applications include the measurement of hydrocarbon based mixtures such as blended fuels and lubricants, and the detection of low levels of moisture.

The implementation of inferential measurements for fluid condition and quality assessment is best made as a differential measurement where changes in fluid composition are monitored relative to the original unused fluid. Differential spectral measurements are not a new concept because they form a basis of photometric measurements of solutions where the spectral contributions of the solvent or dissolution base fluid are cancelled from the recorded spectrum of the solution either in post processing or in real-time. In this measurement the spectrum of the "solvent" is recorded and this is ratioed (division) against the spectrum of the solution or sample. The result is a residual spectrum composed of the differences between the solution and the solvent, which translates to the spectrum of the dissolved material. This effectively zeroes out the contributions of the solvent. In the case of a used oil, the fresh oil spectrum is ratioed against the used oil spectrum.

Differential infrared spectroscopy has been applied to used oil analysis and while it can be used for condition monitoring it is not always applied for routine analysis because much of the spectrum of the base oil falls outside of the measurement range of the instrument, at the normal measurement pathlength, and the higher detail of the infrared spectrum requires an exact match of the fresh oil or base oil. As a result standard used oil analysis method tends to make direct measurements using spectral baselines to calculate the contribution of degradation and contamination components, rather than the differential approach.

A real-time in-line or on-line sensor can be used differently and can still utilize a differential measurement. The standard photometric measurement of a fluid in a sensor system provides a measurement of light transmission through the sample. In the simplest system this provides a light level measurement at a detector of light originating from the source and passing through the sample. If the initial light level is captured then changes in light transmission level as a consequence of the fluid changing its characteristics/composition with age/service can be recorded from the detector output. This is effectively a differential measurement at a single point. However, this method assumes that with time the light level from the source (LED) remains the same. To a first approximation this can work in an ideal system if the voltage to the source is regulated and monitored for variations. If the light source is well characterized in terms of light output as a function of voltage (or current), taking into account adjustments for aging and temperature then this method can work. However, it does not take into account changes that are occurring in the sample where the absorption wavelength may change location and shift as the composition changes.

In a laboratory, differential infrared spectroscopy is enabled by making the measurements in a relatively short period where changes in the source intensity relative to recording the sample spectrum versus the reference spectrum of the fresh oil are minimized. Also, recording the entire spectrum enables band changes and spectral profile changes to be visually monitored and accommodated. The standard fixed point photometric sensor with a differential measurement does not accommodate this and is non-specific relative to spectral changes and shifts. For example, as the fluid ages during its operational life it degrades with the formation of different oxidation and breakdown products. As these are formed they cause significant changes in chemical composition which may not be reflected in the output of the sensor.

Figure 8A:
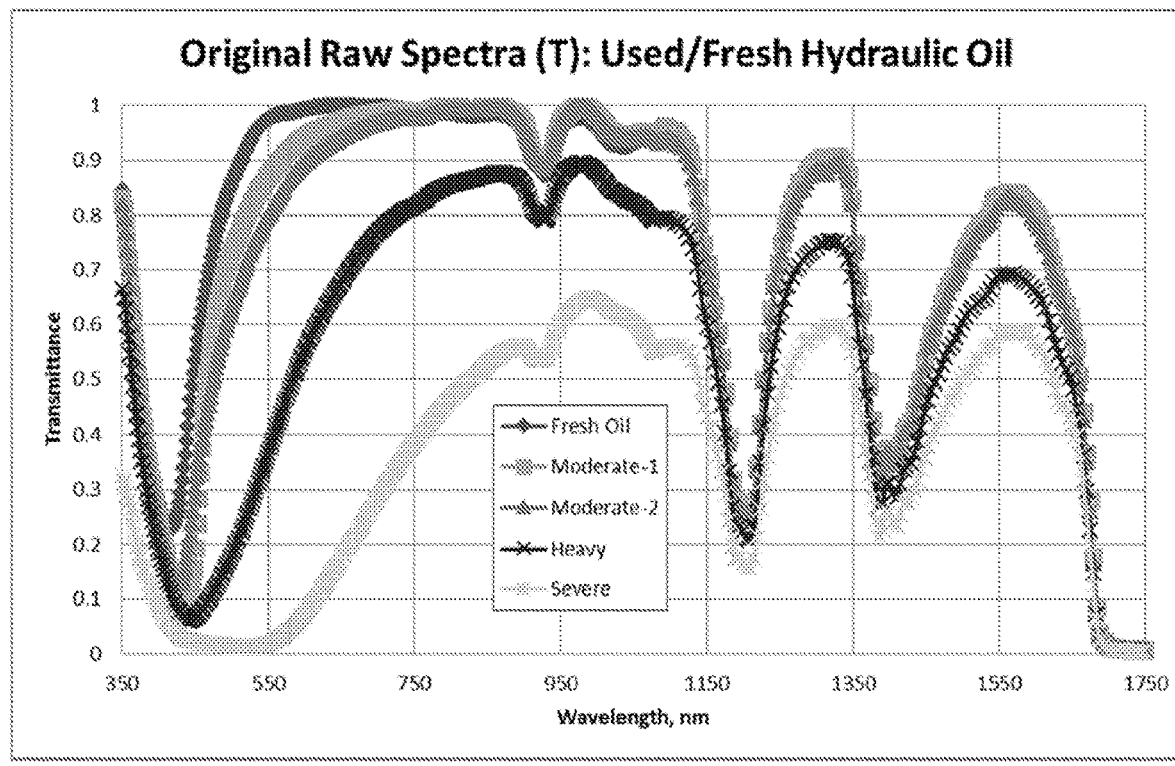
FIG. 8A is a graphical representation of original raw spectral transmittance data of various fluid conditions.
Figure 8B:
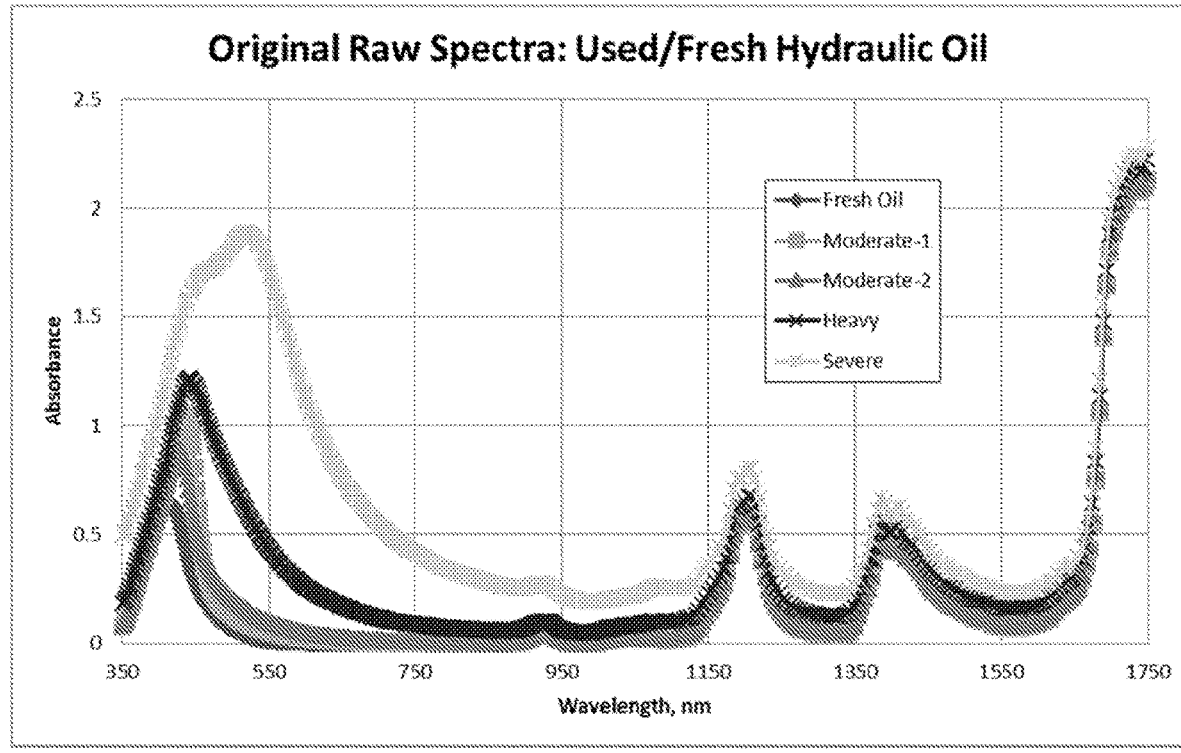
FIG. 8B is a graphical representation of original raw spectra absorbance of various fluid conditions.
Figure 8C:
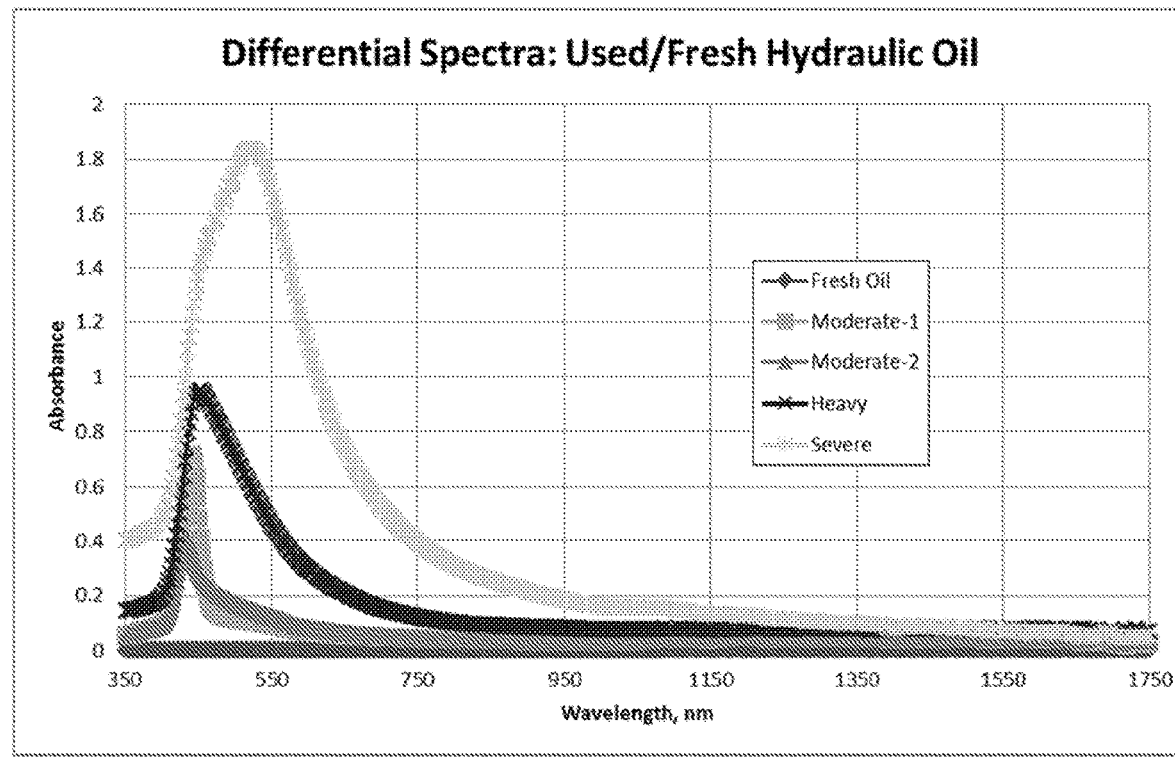
FIG. 8C is a graphical representation of original differential spectra absorbance of various fluid conditions.

This disclosure presents a sensor system that addresses both of the issues raised in regard to making real-time sensor measurement with a differential measurement. These are in regard to monitoring the light source/LED output and accommodating shifts in the spectrum that result from changes in chemical composition that result when oxidation occurs and the fluid degrades. The selected measurement range records these changes as seen in the spectra produced from a series of used hydraulic fluids (FIGS. 8A-8C). Visually, the fluid darkens and the color changes from a pale straw color to a darker yellow, through orange and on to various shades of brown.

These changes are seen in the transmittance form of the visible-NIR spectrum (FIG. 8A). These spectra are presented in the native % transmittance (% T) format where the sample spectrum is compared to the background spectrum of the spectrometer and the spectrum is shown as the percentage of light transmitted through the sample as a function of wavelength. Analytically, this spectrum is used to provide diagnostics in terms of overall changes in the sample. When used for quantitative measurements it is normal to convert this spectrum to an absorbance format (FIG. 8B), where an inverse logarithmic function is used that changes linearly with changes in component concentration. Either format of the spectrum can be used for assessing the overall impact of aging of the fluid, and both show the total spectrum with oxidation/degradation product plus the background spectrum of the oil. However, going to a differential output, shown in FIG. 8C, the absorption spectrum now clearly delineates the oxidation and degradation components of the fluid from the background of the fluid. All other spectral features, other than spectral changes from aging/degradation are minimized or reduced to zero. This opens the door to making a vector based assessment of oil condition where measurements are made at fixed wavelength points across the spectrum as defined by the LED wavelengths.

Figure 9A:
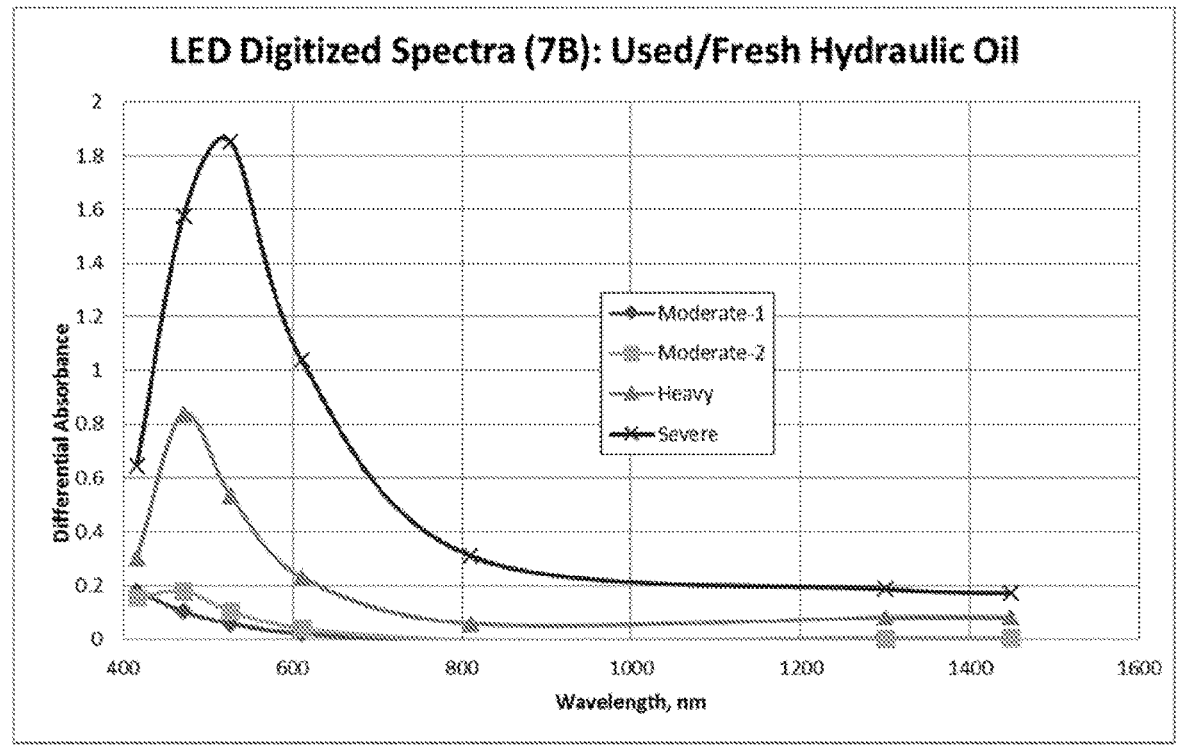
FIG. 9A is a graphical representation of the differential absorbance of a 7-channel sensor of the present invention of various fluid conditions.
Figure 9B:
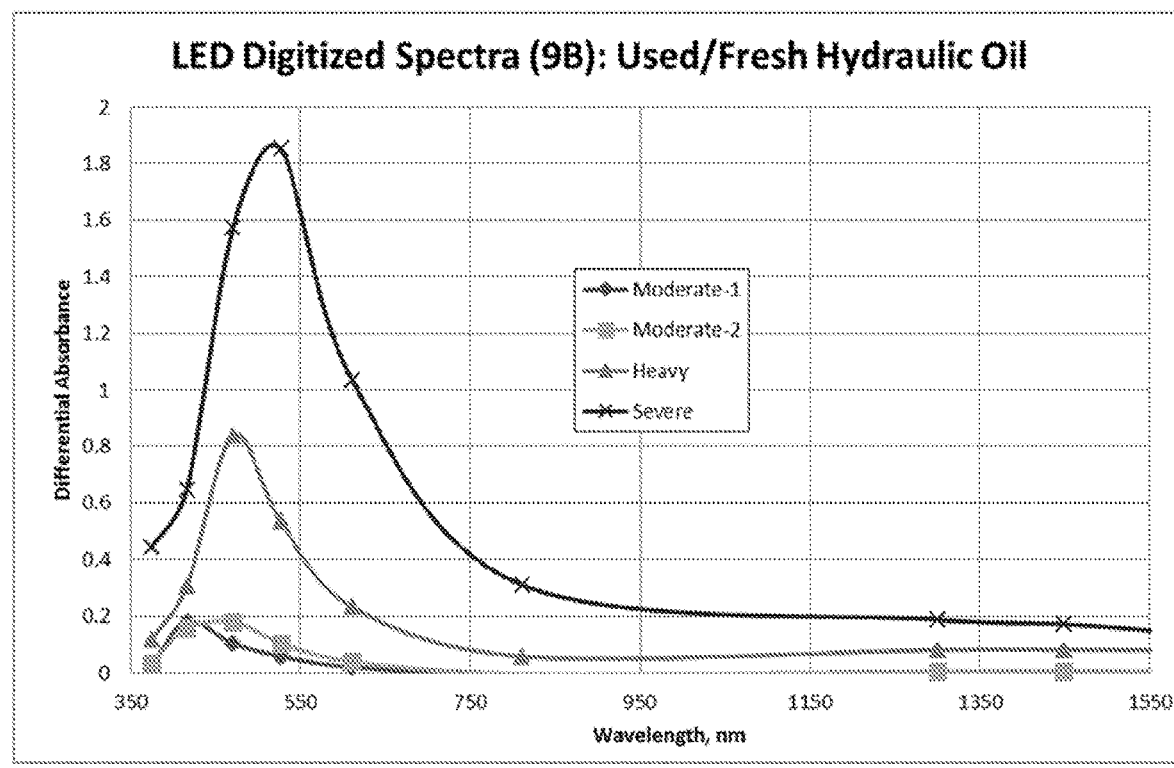
FIG. 9B is a graphical representation of the differential absorbance of a 9-channel sensor of the present invention of various fluid conditions.
Figure 9C:
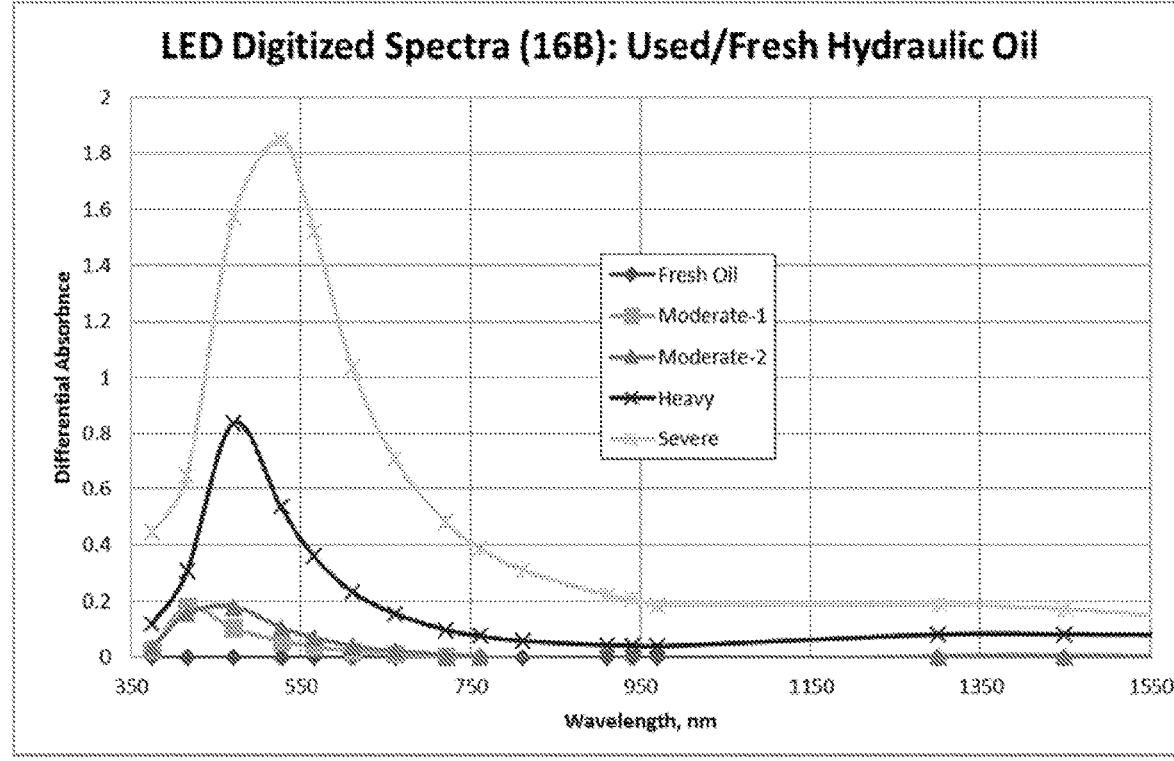
FIG. 9C is a graphical representation of the differential absorbance of a 16-channel sensor of the present invention of various fluid conditions.
Figure 10A:
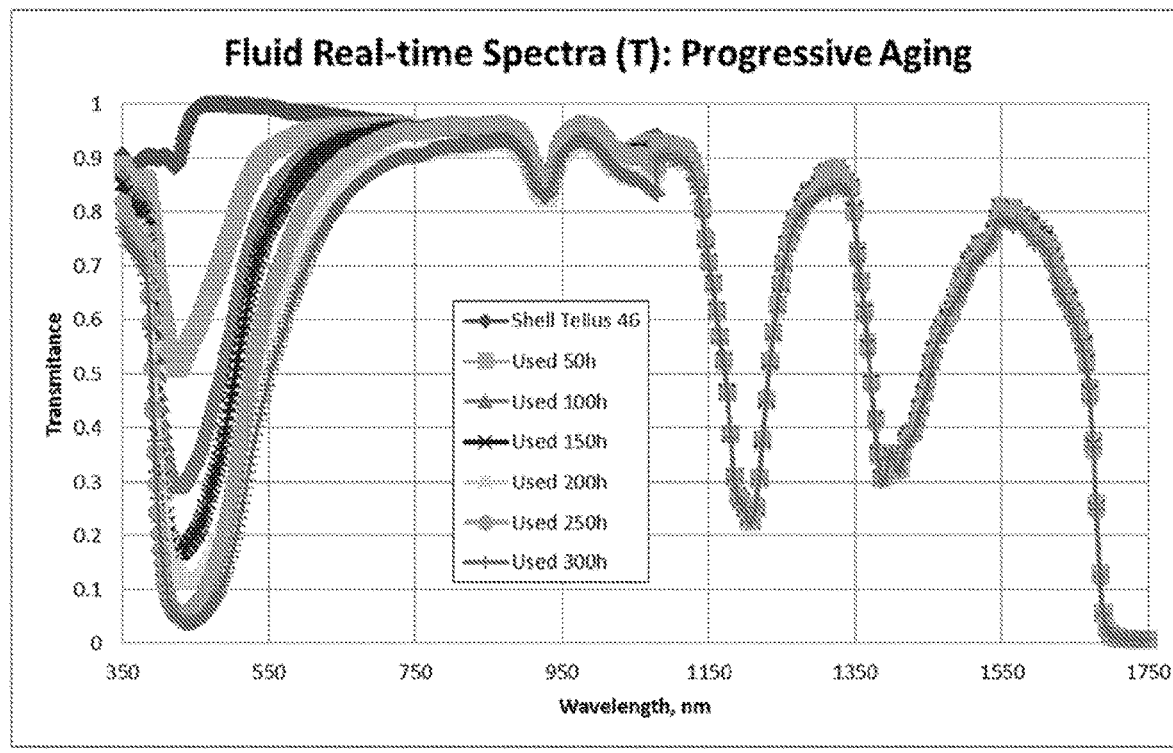
FIG. 10A is a graphical representation of the spectral transmittance of hydraulic fluid.
Figure 10B:
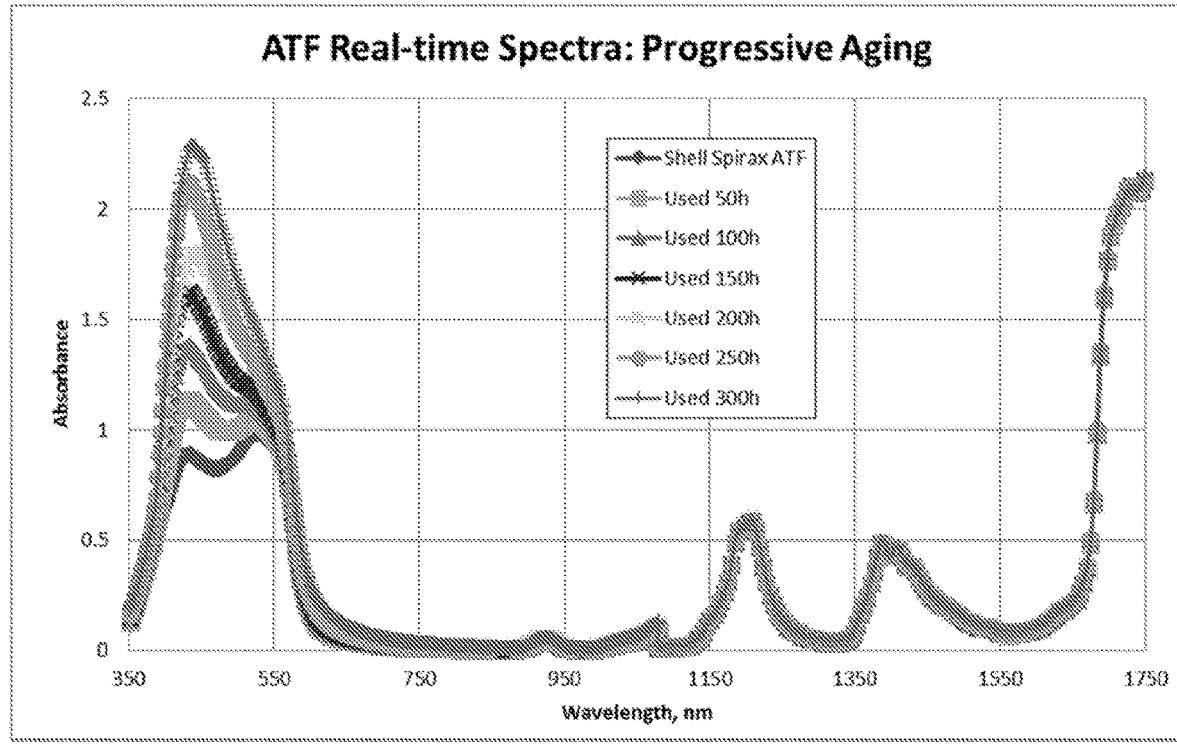
FIG. 10B is a graphical representation of the spectral absorbance of hydraulic fluid.
Figure 10C:
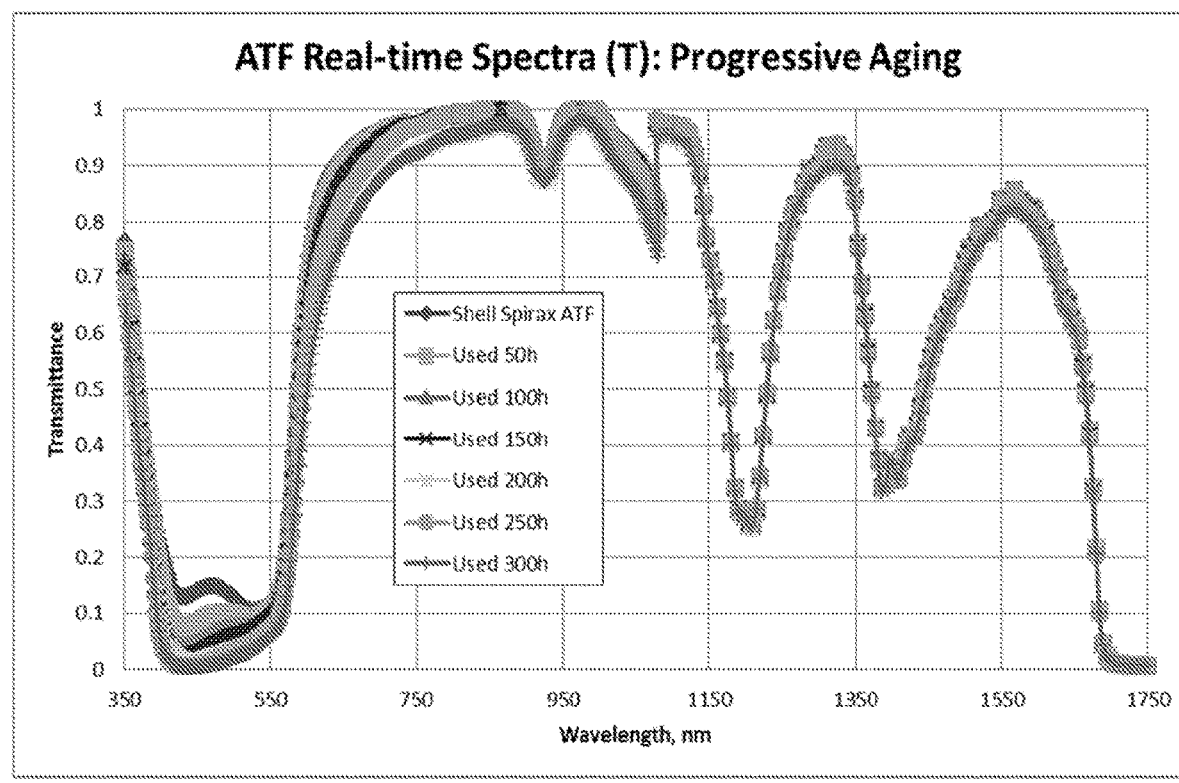
FIG. 10C is a graphical representation of the spectral transmittance of automatic transmission fluid (ATF).
Figure 10D:
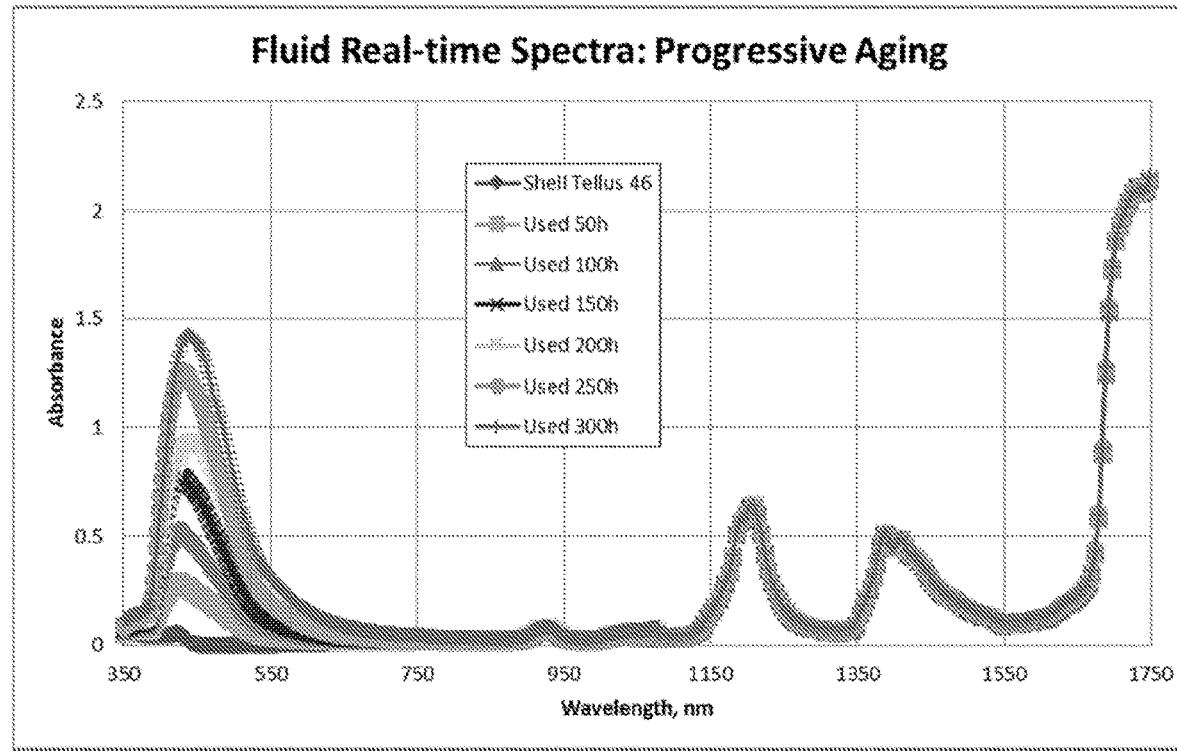
FIG. 10D is a graphical representation of the spectral absorbance of ATF.

Using the approach discussed above, referencing FIG. 7B for fresh, unused oil, it is possible to monitor the exact profile and nuances of spectral changes with a minimum set of LED wavelengths (FIGS. 9A-9C). These presentations illustrate how the spectral vector can be generated from seven (7), nine (9) and sixteen (16) LEDs, where it can be seen that even with the minimum number the aging vector can be sufficiently well reproduced. If aging plus a limited monitoring of fluid contamination and degradation is all that is required then a seven LED (6 around 1 configuration) provides a simple implementation. For this application the nine and sixteen LED implementations are not necessarily required.

FIG. 10 shows the importance of the differential monitoring by expanding the measurement of progressive aging to include fluids with highly colored base oils, such as the automatic transmission fluids (ATFs) which have a characteristic red dye used to visually distinguish the Dexron II specification fluids. These fluids are used in a dual function mode where they double as hydraulic fluids. FIG. 10A and FIG. 10C show the standard % transmittance format for a series of standard hydraulic fluids (mineral oil based) and a parallel series of ATFs respectively. FIG. 10B and FIG. 10D provide the absorbance forms of these two data sets. The differentiation of the aging contribution from the red dye component of the ATF is clearly defined in FIG. 10D.

Figure 11A:
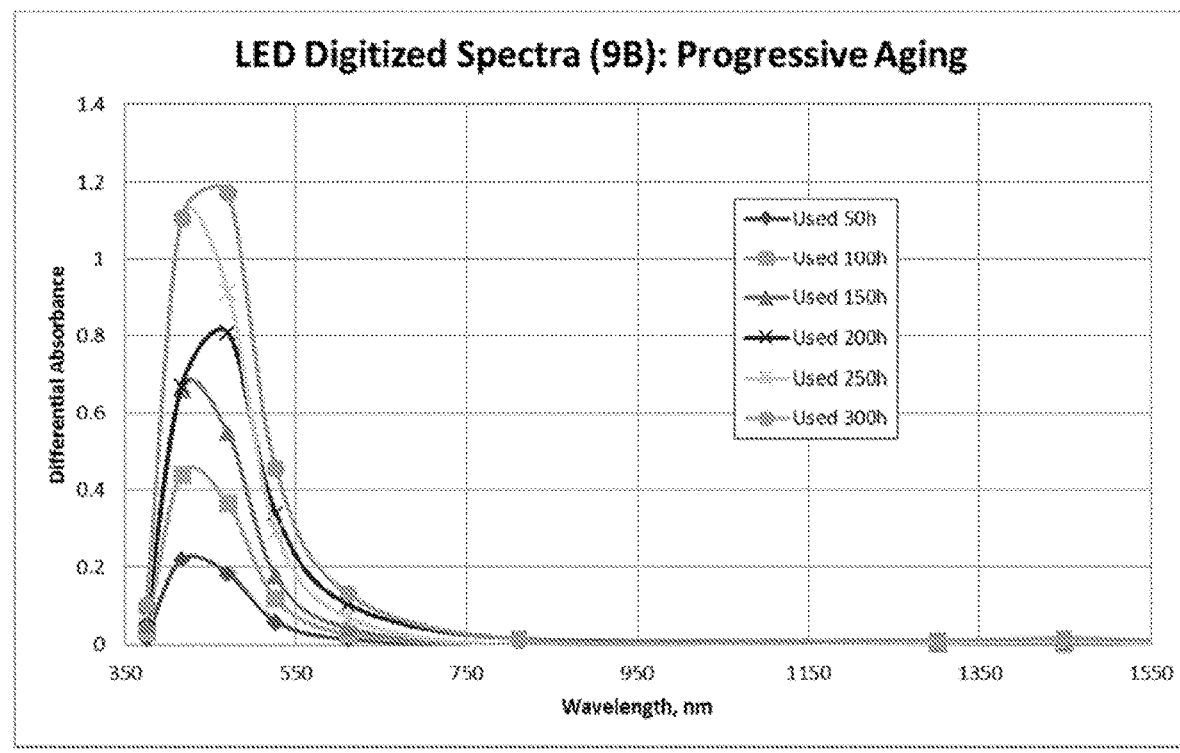
FIG. 11A is a graphical representation of the spectral differential absorbance of progressively aging fluids using a 9-channel LED sensor.
Figure 11B:
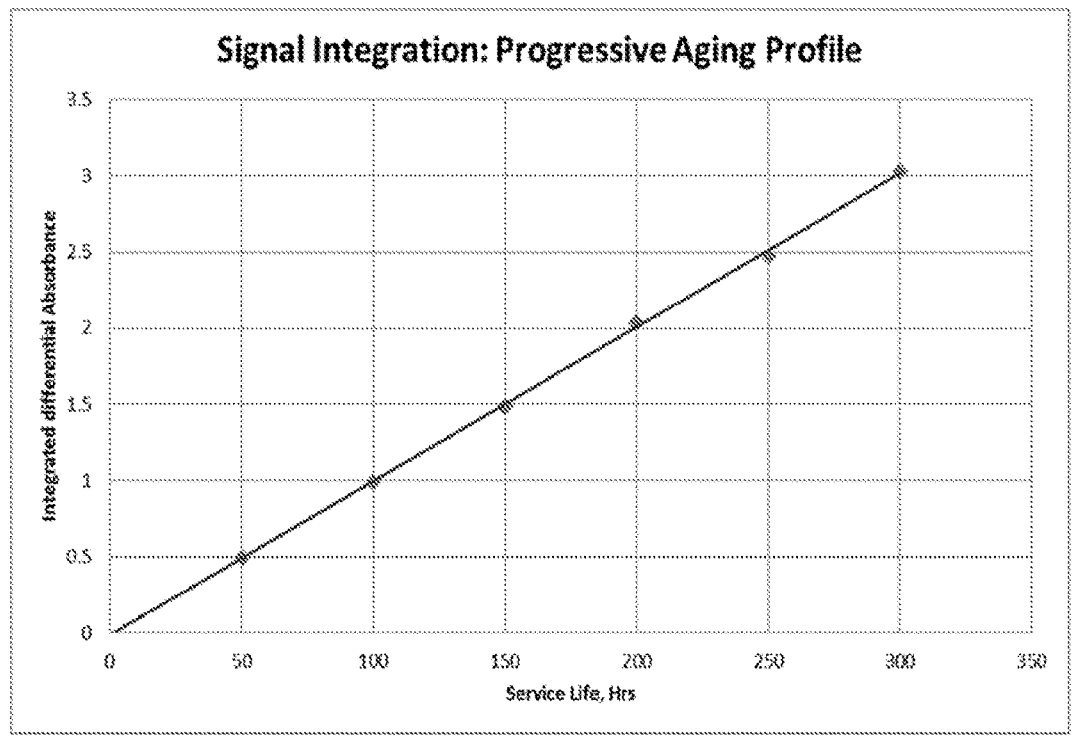
FIG. 11B is a graphical representation of the integrated differential absorbance of the progressive aging profile of fluids.
Figure 11C:
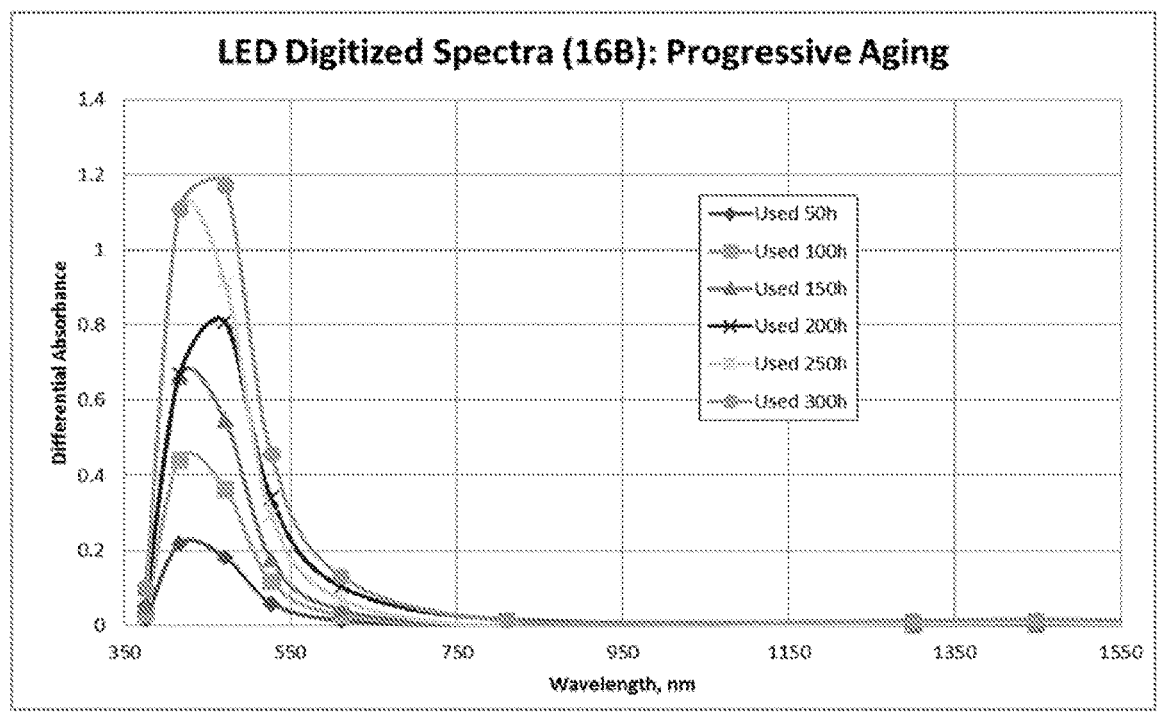
FIG. 11C is a graphical representation of the spectral differential absorbance of progressively aging fluids using a 16-channel LED sensor.

The reconstructed spectra from the nine and sixteen LED digitized differential data for these two oils indicates a good clean removal of the background spectra from the nine LED digitized data set (FIGS. 11A and 11B). It is important to increase the digitization level from seven to nine to ensure clean separation from the red dye contribution of the ATF. Changes in oxidation spectral profiles are reproduced and although the peak profiles change with increasing levels of aging degradation the overall component peak areas retain the progression with increased service use (up to 300 hrs) as indicated by peak area integration values. An expected linear increase in these values is obtained by a summation of the data values for the interpolated peak maximum (FIG. 11C).

The presence of particulate, along with the formation of dispersed insoluble materials formed from extended material degradation is detected by optical attenuation across the full range of the spectrum (as specified 350 nm to 1700 nm). In the case of light scattering from particulates, there is a wavelength component with maximum attenuation at shorter wavelengths. When a transmission measurement is performed, as in the case of the multi-wavelength sensor in this disclosure, the optical baseline has a slope superimposed from low to high wavelength as observed in FIGS. 12 and 13.

Figure 12A:
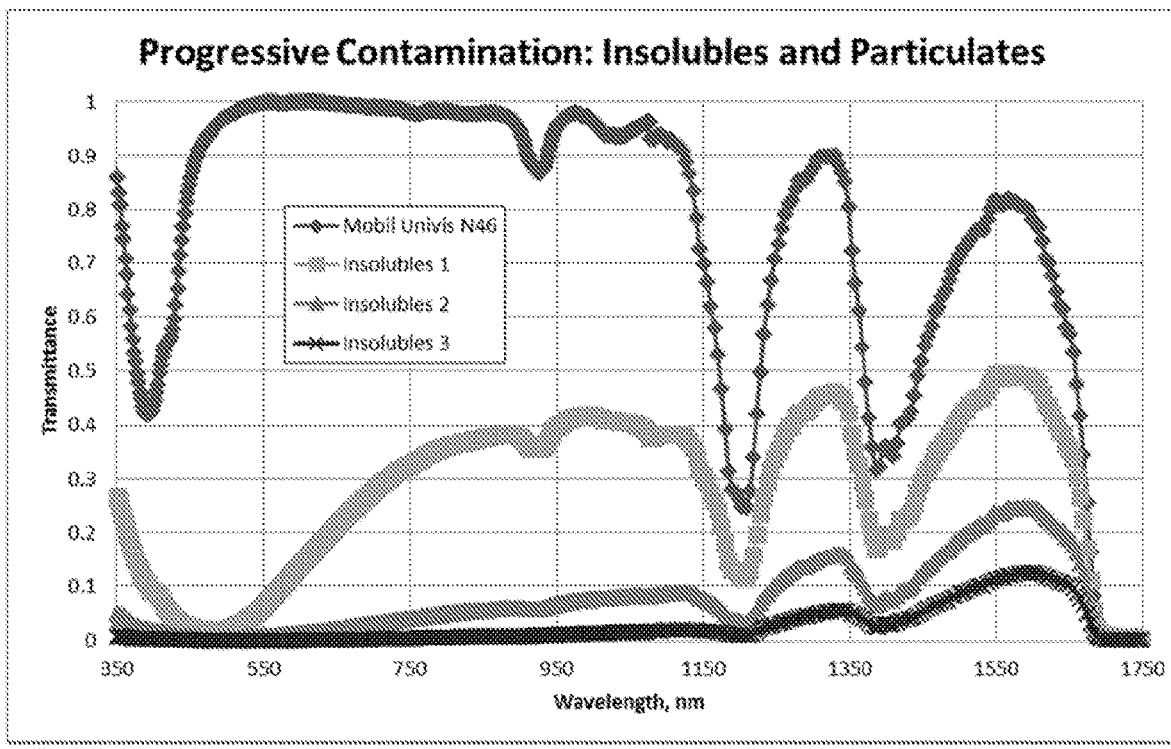
FIG. 12A is a graphical representation of the spectral transmittance of fluids having insoluble and/or particulate matter.
Figure 12B:
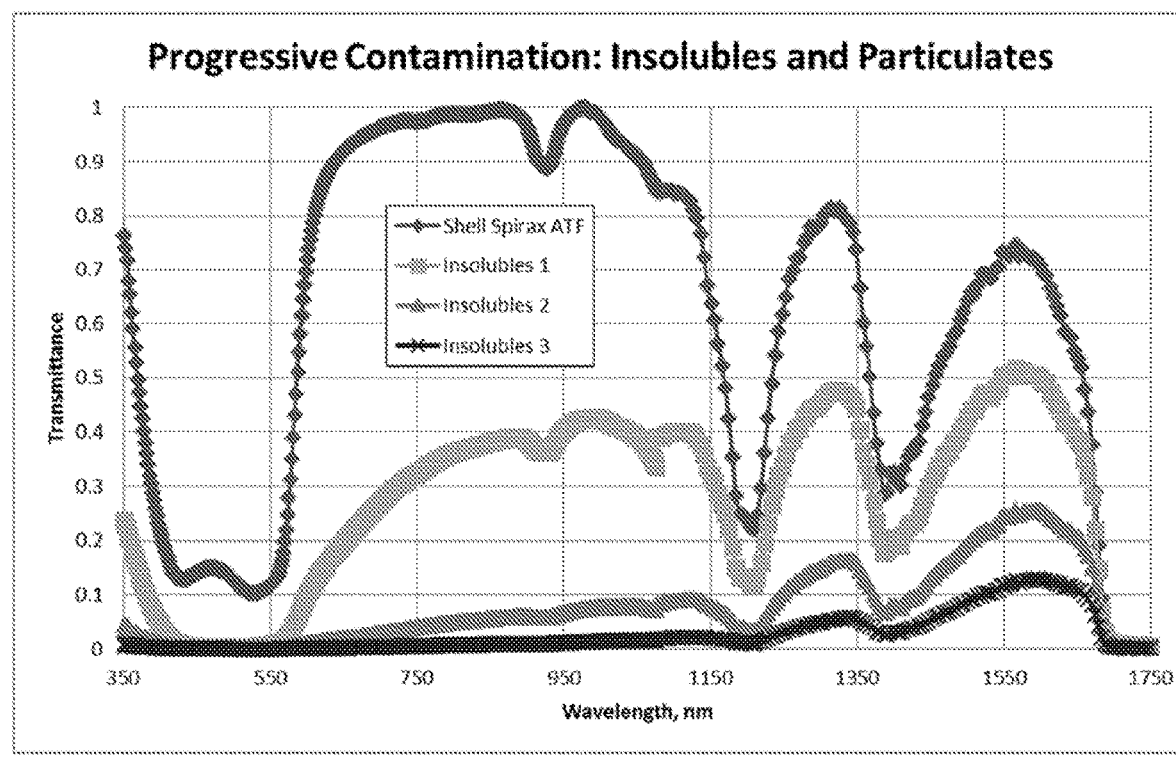
FIG. 12B is a graphical representation of the spectral transmittance of fluids having insoluble and/or particulate matter.
Figure 12C:
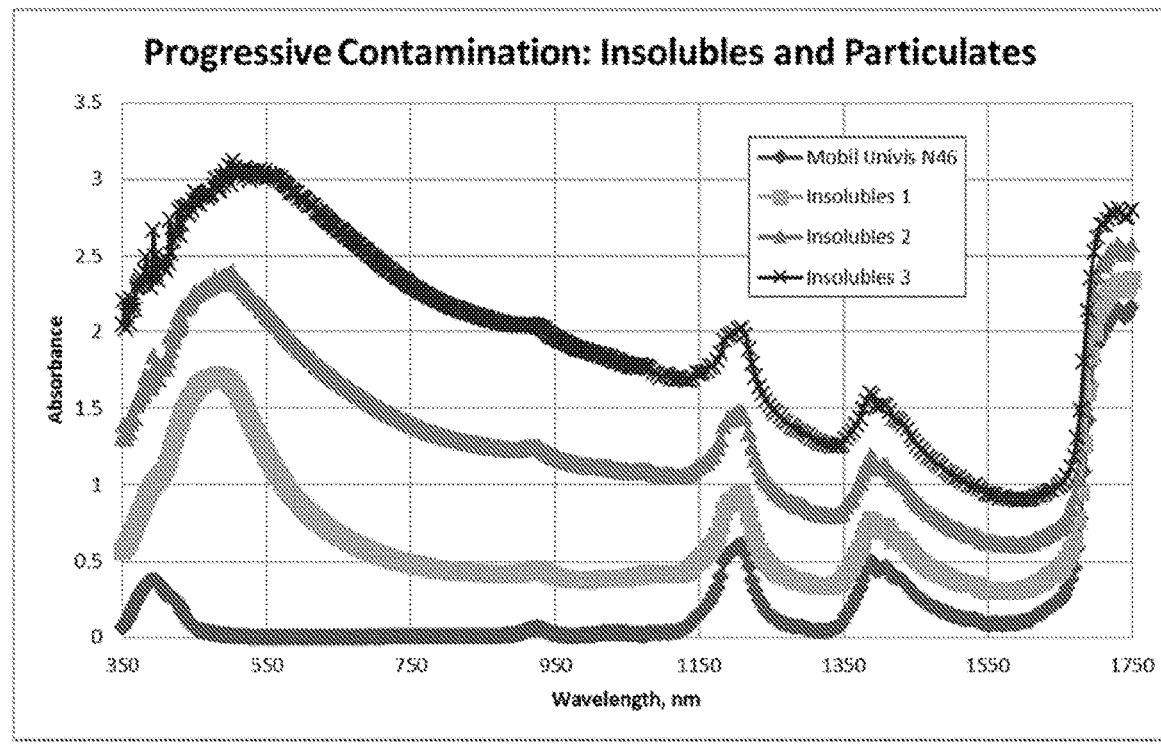
FIG. 12C is a graphical representation of the spectral absorbance of fluids having insoluble and/or particulate matter.
Figure 12D:
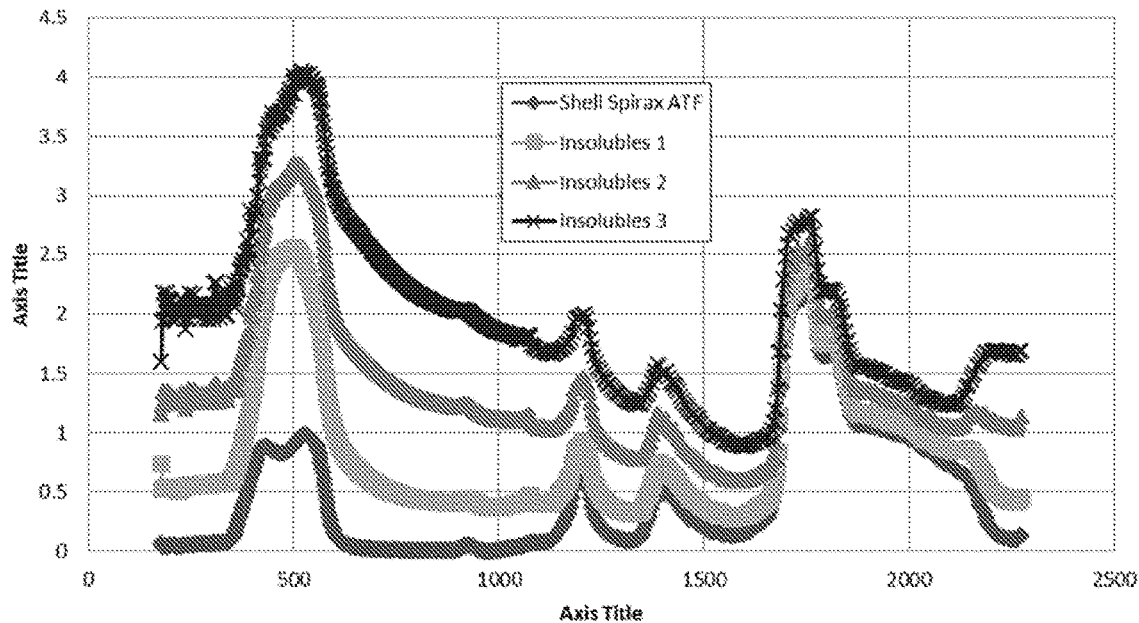
FIG. 12D is a graphical representation of the spectral absorbance of fluids having insoluble and/or particulate matter.
Figure 13A:
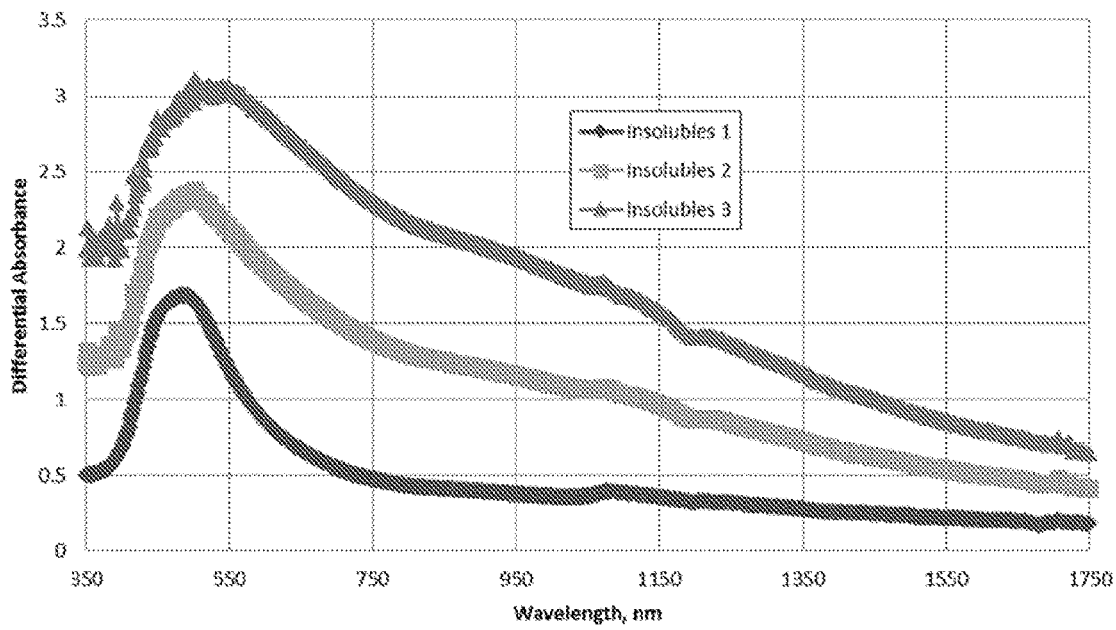
FIG. 13A is a graphical representation of the spectral differential absorbance of fluids having insoluble and/or particulate matter.

FIGS. 12A and 12B provide full range spectral transmission data for two series of fluids with increasing levels of dispersed insoluble/particulate material; one a conventional hydraulic fluid and the other an ATF (DEXRON II, red dye). FIGS. 12A and 12C are for the fluid Mobil Univis N46, while FIGS. 12B and 12D are for Shell Spirax ATF. The presence of the insoluble/particulate material is very evident from the reduced level of light transmission in the spectral background, which increases from 700 nm to 1700 nm. In both cases the light attenuation from the background color of the fluid is still evident between 350 nm and 700 nm, which can be compensated by the differential measurement, as shown in FIG. 13A. The light absorption function of the fluid plus insoluble/particulates is presented in FIGS. 12C and 12D. This function is calculated from the normal transmission form of the spectral data by the Logarithm of the reciprocal of the transmission spectral data using the equations below.

$$\text{Transmittance} = (I_{sample}/I_{background}) = T \quad \text{Equation 3:}$$

$$\% \text{ Transmittance} = (I_{sample}/I_{background}) \times 100 = \% T \quad \text{Equation 4:}$$

Where $I_{sample}$ is the measured light transmitted through the fluid, $I_{background}$ is the light transmitted through the cell (measurement cavity) in the absence of the sample $$\text{Absorption function} = \text{Log } 1/T = A \quad \text{Equation 5:}$$

$$\text{Absorption function} = \text{Log } 100/\% T = A \quad \text{Equation 6:}$$

As noted, the differential measurement provides the absorption function of the insoluble/particulates with the removal of the spectral background from the fluid itself.

$$A_{differential} = A_{used\ sample} - A_{fresh\ oil} \quad \text{Equation 7:}$$

Figure 13B:
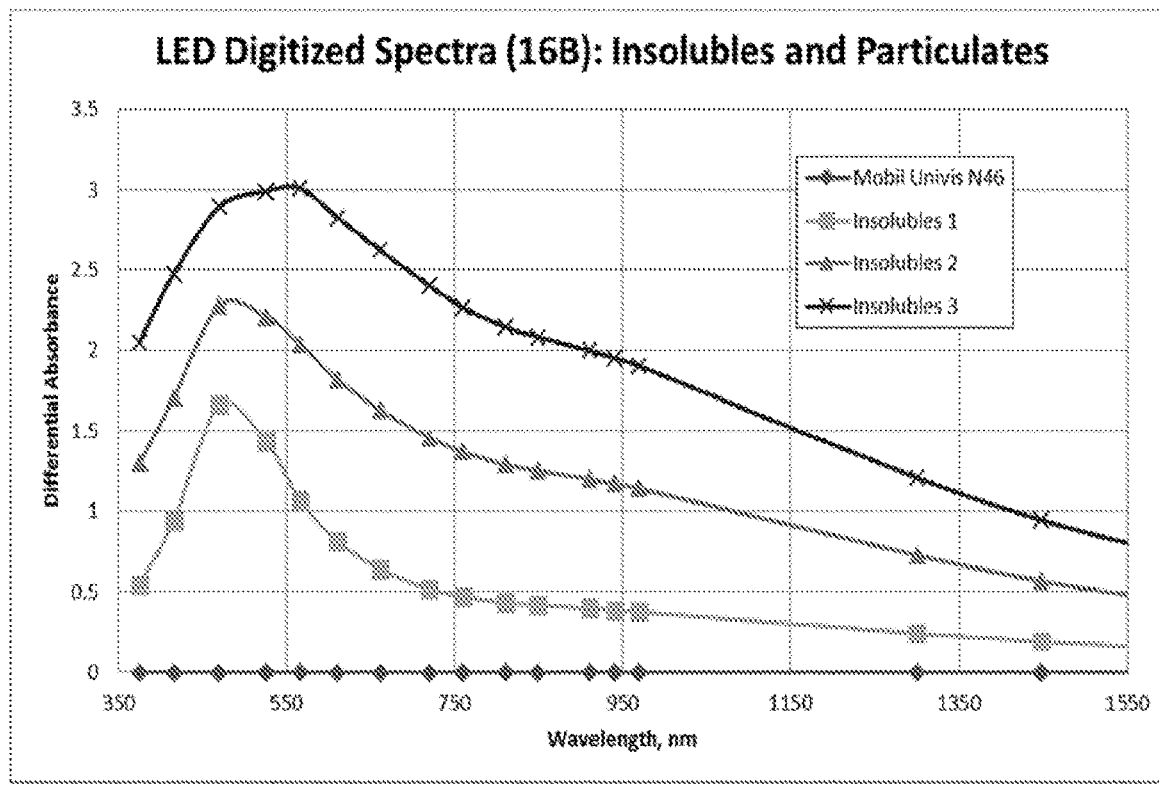
FIG. 13B is a graphical representation of the spectral differential absorbance of fluids having insoluble and/or particulate matter using a 16-channel sensor of the present invention.
Figure 13C:
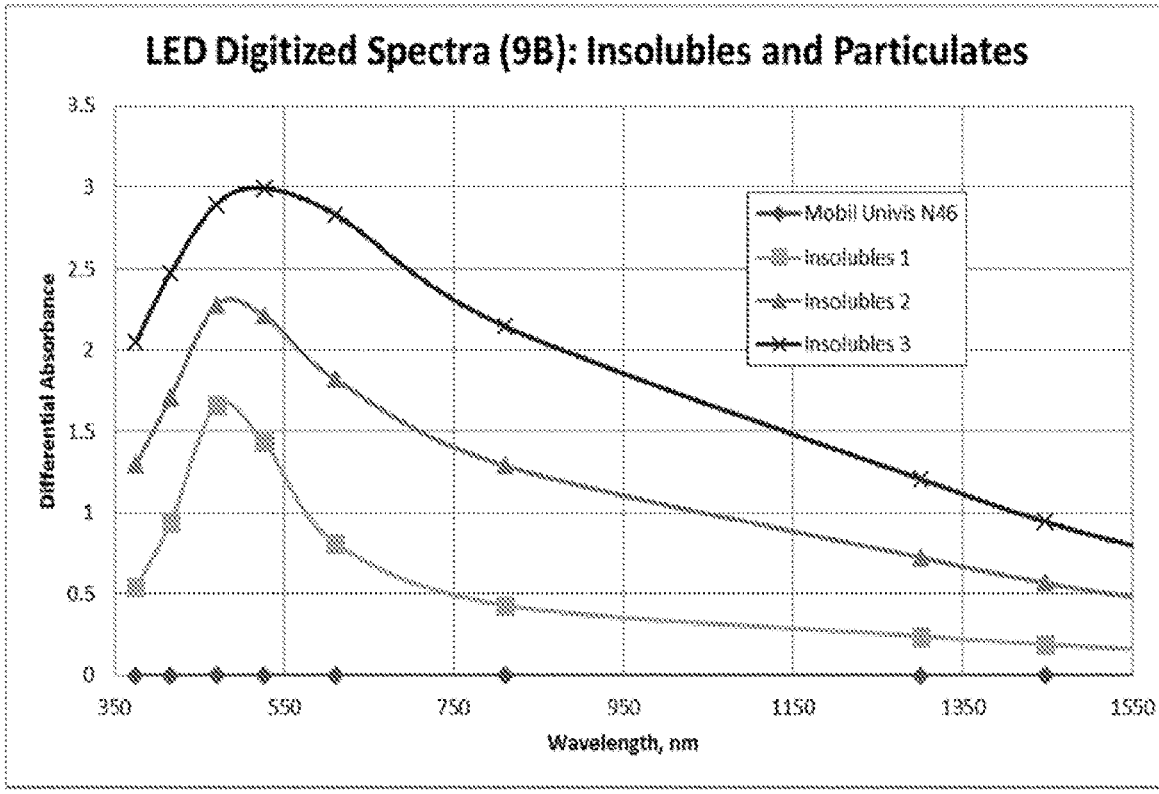
FIG. 13C is a graphical representation of the spectral differential absorbance of fluids having insoluble and/or particulate matter using a 9-channel sensor of the present invention.

The differential spectral data recorded in absorption format is provided in FIG. 8A. This absorption profile is duplicated in the regeneration of the "spectrum" (interpolated) from 9 or 16 LED digitized data as shown in FIGS. 13B and 13C. From these presentations the nine (9) LED result is adequate, although a slightly higher resolution result is obtained with sixteen (16) LEDs, leading to a more accurate reconstruction of the original spectral profile. These figures illustrate the differential/inferential concept for evaluating fluid condition. A vector-based assessment using the data points provide the trending needed to define the impact of the insolubles/particulates. The traditional analysis for this measurement is the total solids measurement and this scalar value can be correlated, by calculating the scalar output from the summation of the output vector (Table 7). Note that these values are presented as values calculated from the transmittance form of the spectral data. As a consequence the increase in the insolubles/particulates content is represented as a decreasing value for the scalar output result.

There are two major sources of insoluble/particulates and the main source of these is excessive aging, where the oxidation/degradation products build up to the point where the aging components come out of solution and become suspended as dispersed insoluble materials. These materials may stay in suspension, or may deposit with time on the walls or bottom of the mechanical system. The other relevant source of particulates is physical breakdown products from component wear, either metal components or elastomeric components in the form of degraded oil seals. The first and most likely source is the oil breakdown products, which can be accompanied by the formation of oxidation/aging components having a detectable spectral signature. This is illustrated in FIG. 13A by the peak maximum between about 500 nm and about 550 nm. This maximum is observed with a differential absorbance in excess of 1.5. Values above an absorbance of about 1.0 can be considered as a trigger point or an alarm for warning of excessive aging or oil breakdown. The assessment of fluid condition can be scored as a vector or a scalar representation, which are discussed later in Tables 5-7.

Similar vectors can be generated for the detection of water in the fluid, dependent on the level of contamination. At low levels, defined as trace levels, typically between about 100 ppm and about 1000 ppm, and dependent of the fluid formulation, there may be marginal solubility of water in the fluid. This may be accompanied by a slight loss in transparency with a hazy appearance to the fluid. At these low levels this entrainment of water will be detected either as water absorption, occurring at ~1450 nm, as shown in FIG. 13C and FIGS. 14A-14C. This slight haziness of the fluid, as detected in the spectrum, is consistent with moisture ingress, which may show a degree of temperature sensitivity as the equipment, and consequently the fluid warms up. Under these conditions the sensor output will register some light scattering, observed as a slight sloping background at low temperature and will increase in optical clarity as the fluid warms up with the disappearance of the sloping background.

Figure 14A:
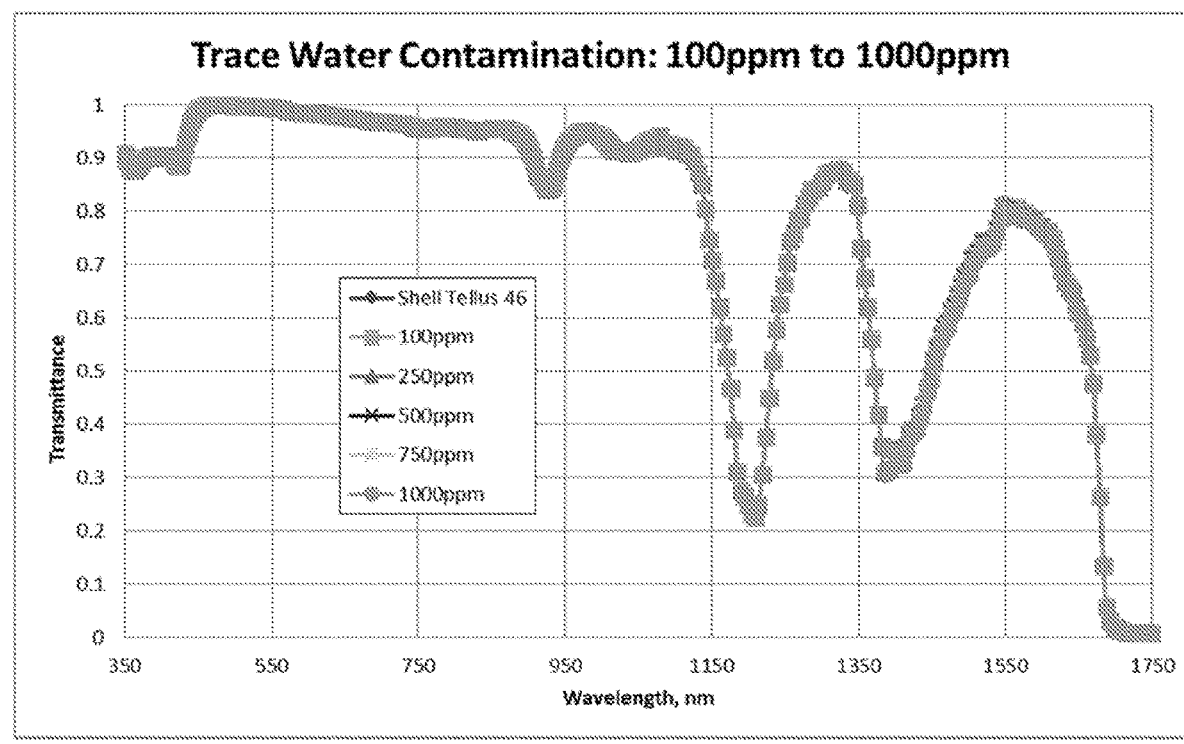
FIG. 14A is a graphical representation of the spectral transmittance of 100 ppm to 1000 ppm of trace dissolved water contamination of a fluid.
Figure 14B:
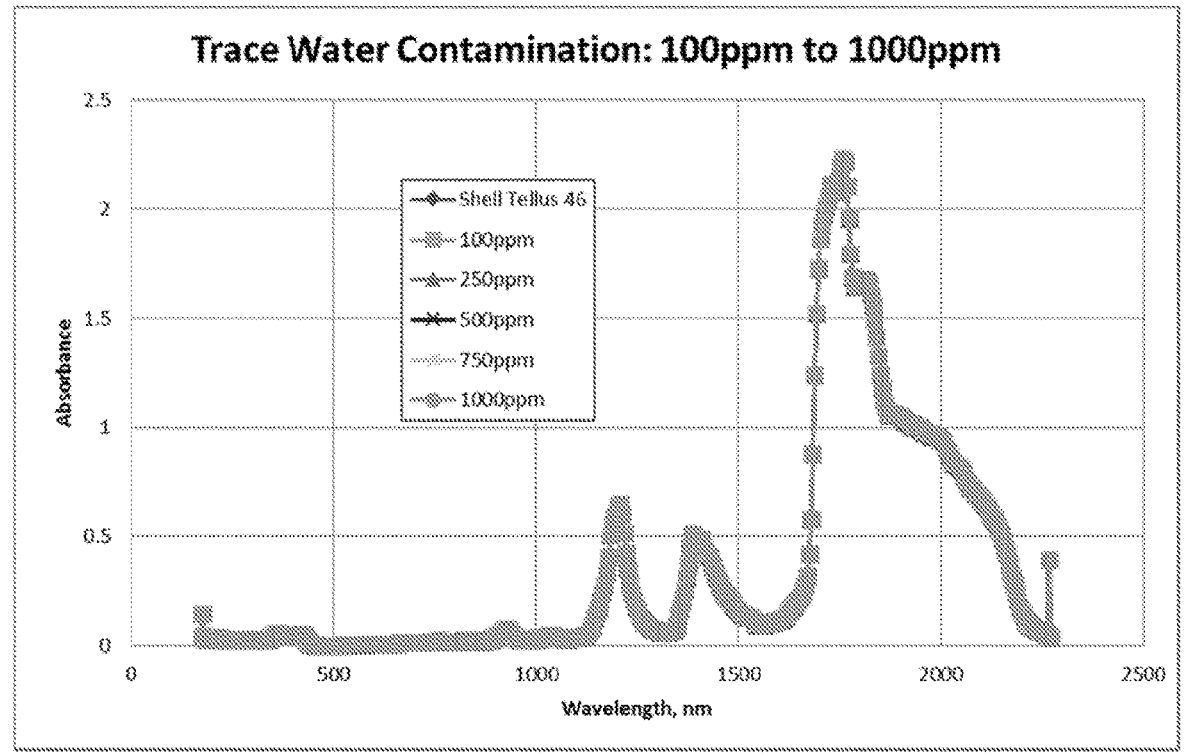
FIG. 14B is a graphical representation of the spectral absorbance of 100 ppm to 1000 ppm of trace dissolved water contamination of a fluid.
Figure 14C:
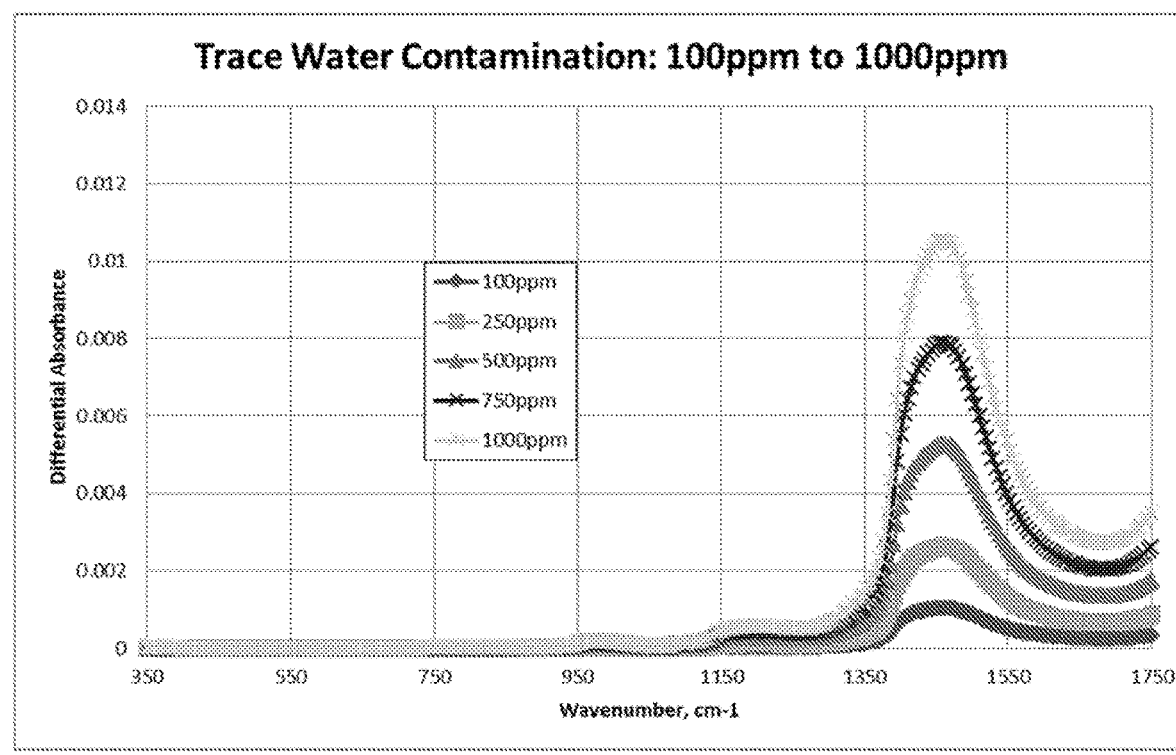
FIG. 14C is a graphical representation of the spectral differential absorbance of 100 ppm to 1000 ppm of trace dissolved water contamination of a fluid.
Figure 15A:
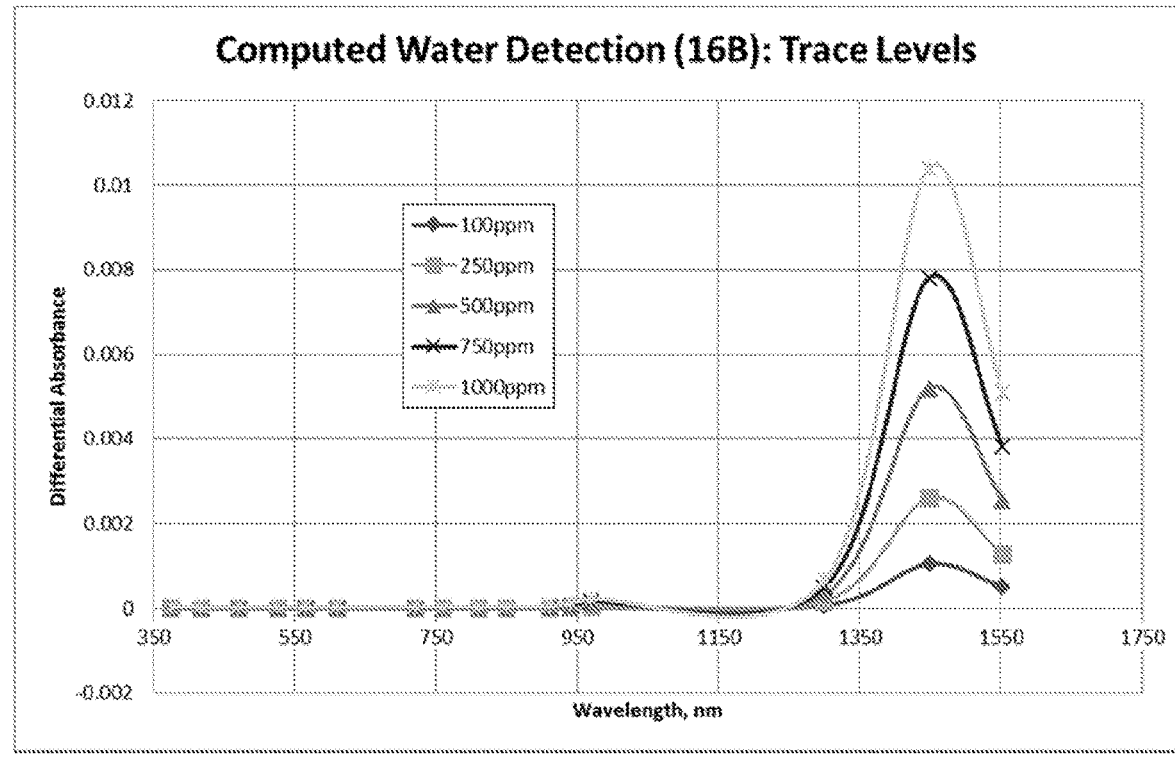
FIG. 15A is a graphical representation of the spectral differential absorbance of trace moisture contamination of a fluid using a 16-channel sensor of the present invention.
Figure 15B:
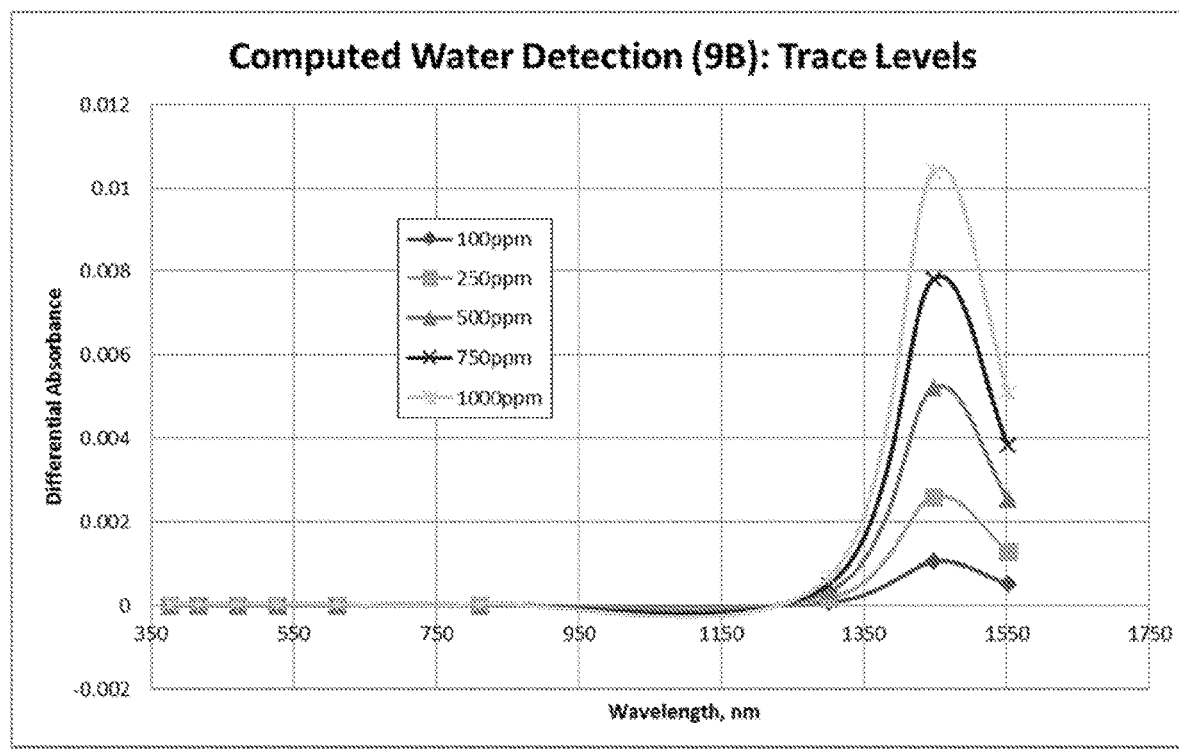
FIG. 15B is a graphical representation of the spectral differential absorbance of trace moisture contamination of a fluid using a 9-channel sensor of the present invention.
Figure 15C:
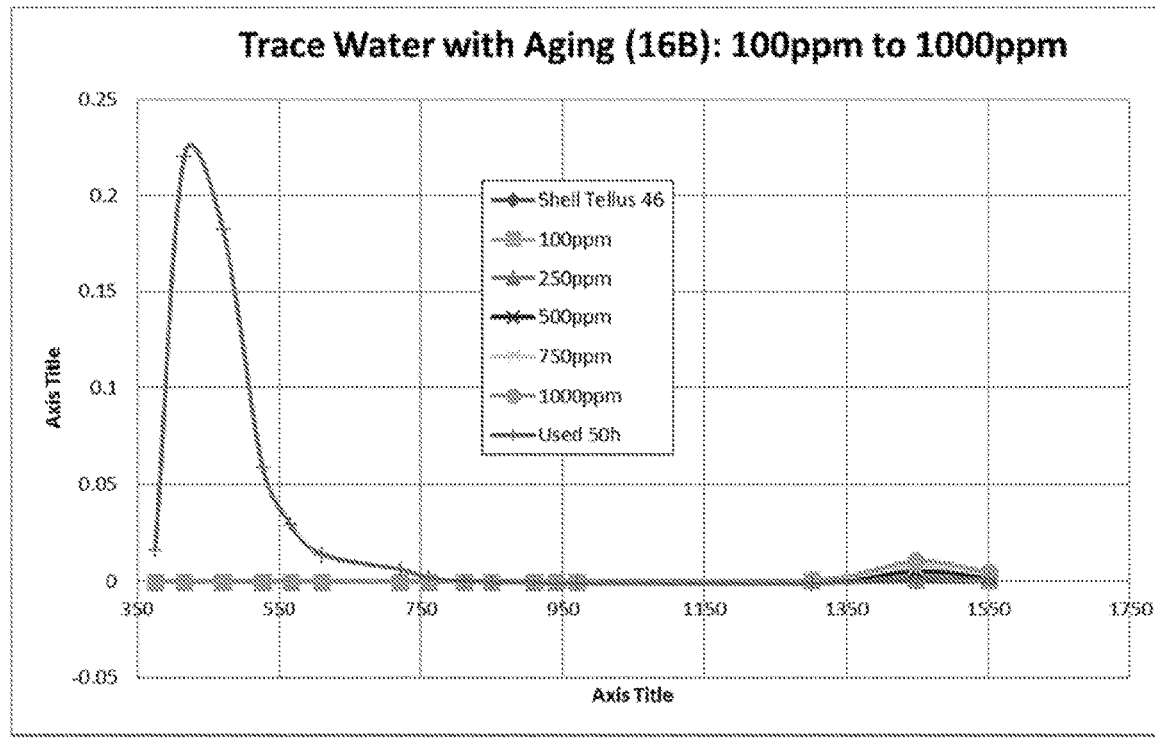
FIG. 15C is a graphical representation of the spectral differential absorbance of trace moisture contamination of aging fluid using a 9-channel sensor of the present invention.
Figure 16A:
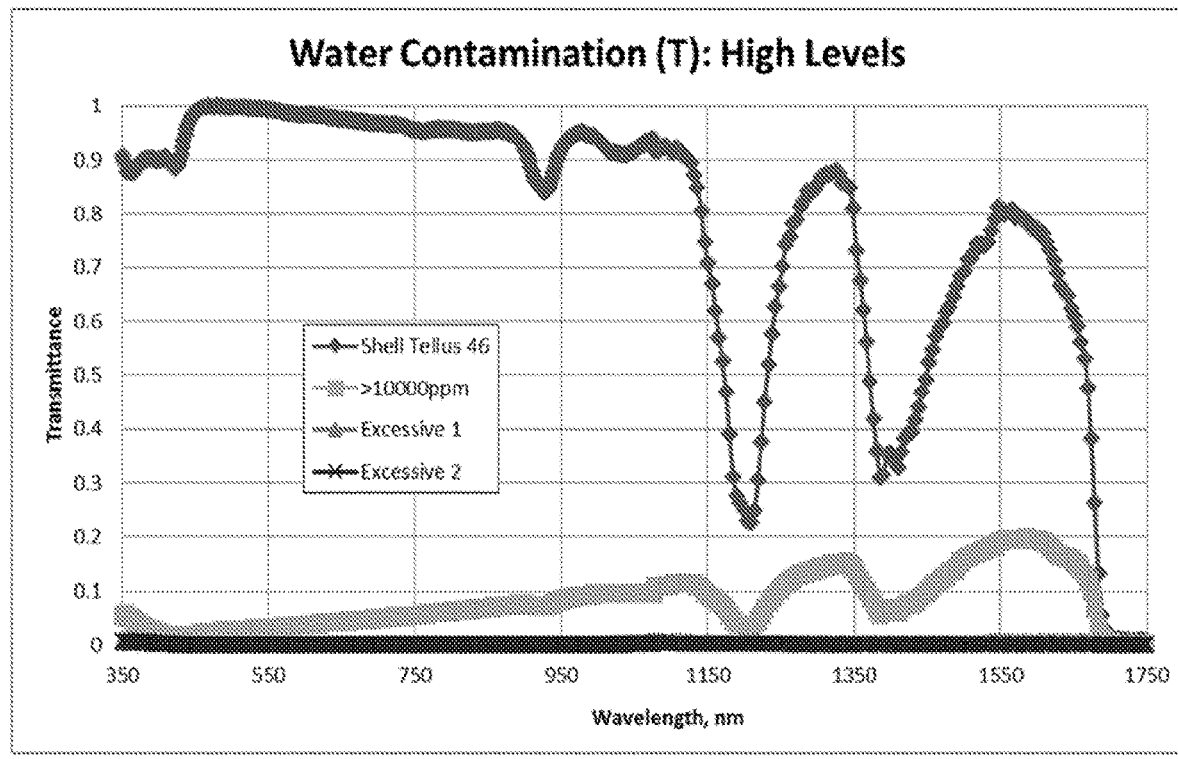
FIG. 16A is a graphical representation of the spectral transmittance of gross water contamination of a fluid.
Figure 16B:
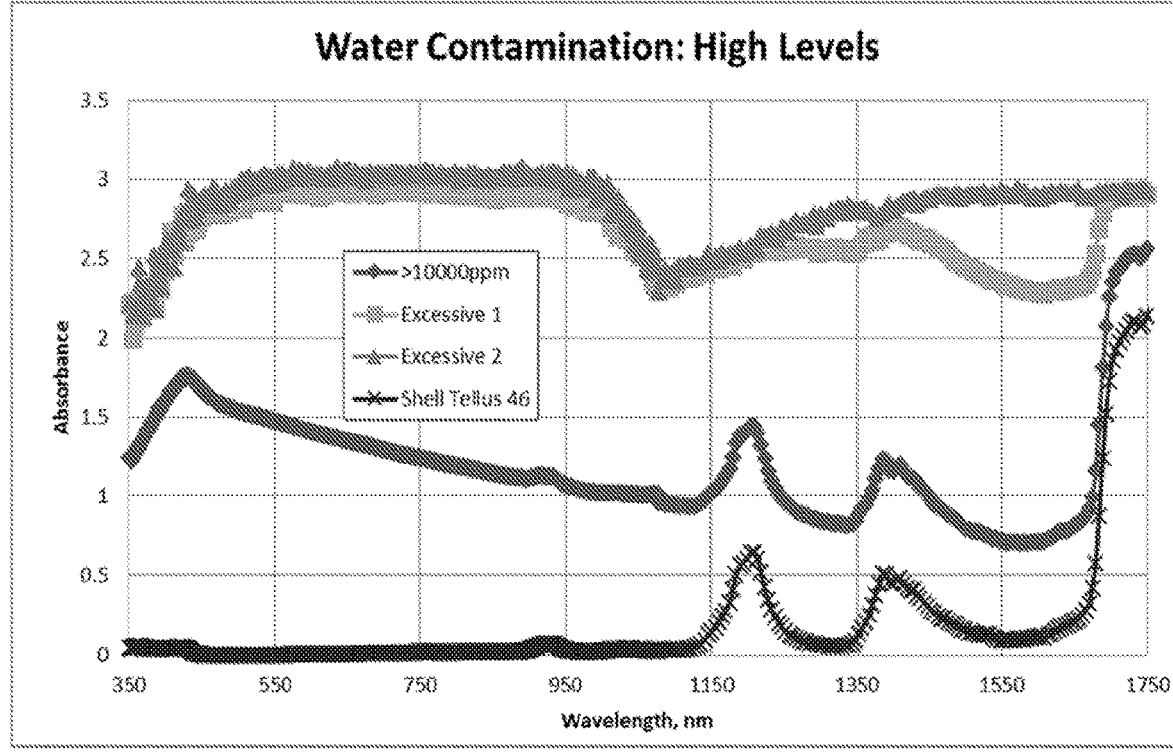
FIG. 16B is a graphical representation of the spectral absorbance of gross water contamination of a fluid.
Figure 16C:
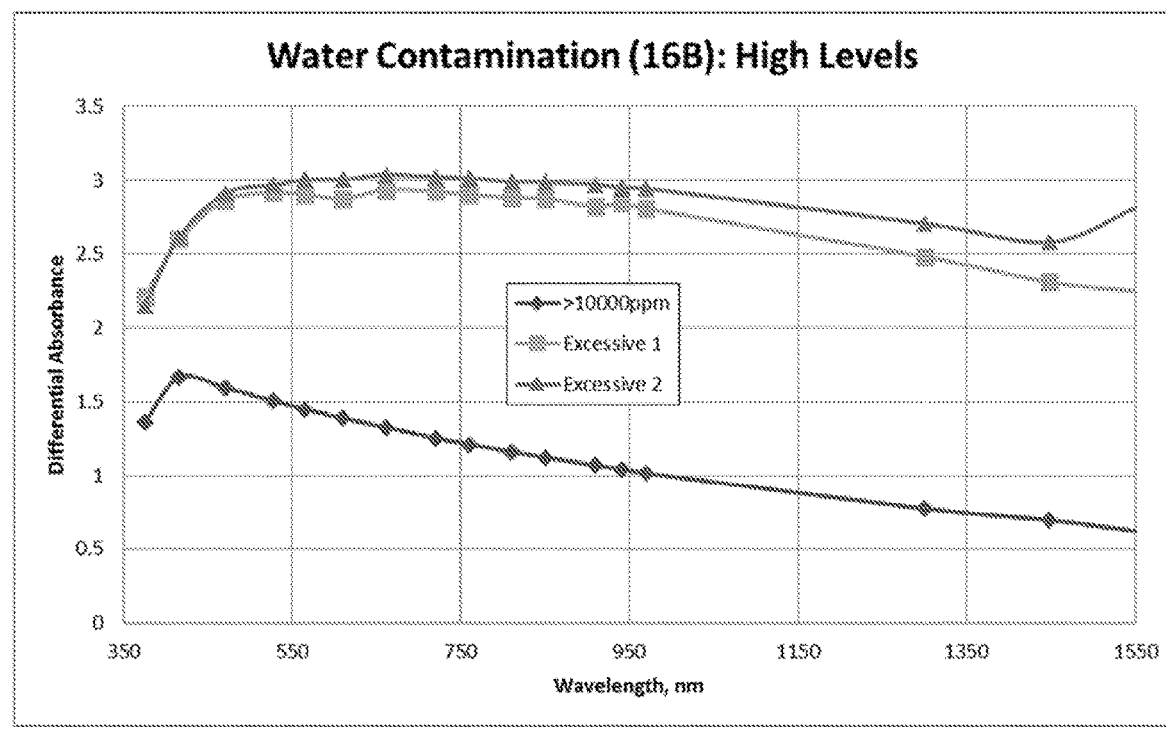
FIG. 16C is a graphical representation of the spectral differential absorbance of gross water contamination of a fluid using a 16-channel sensor of the present invention.
Figure 16D:
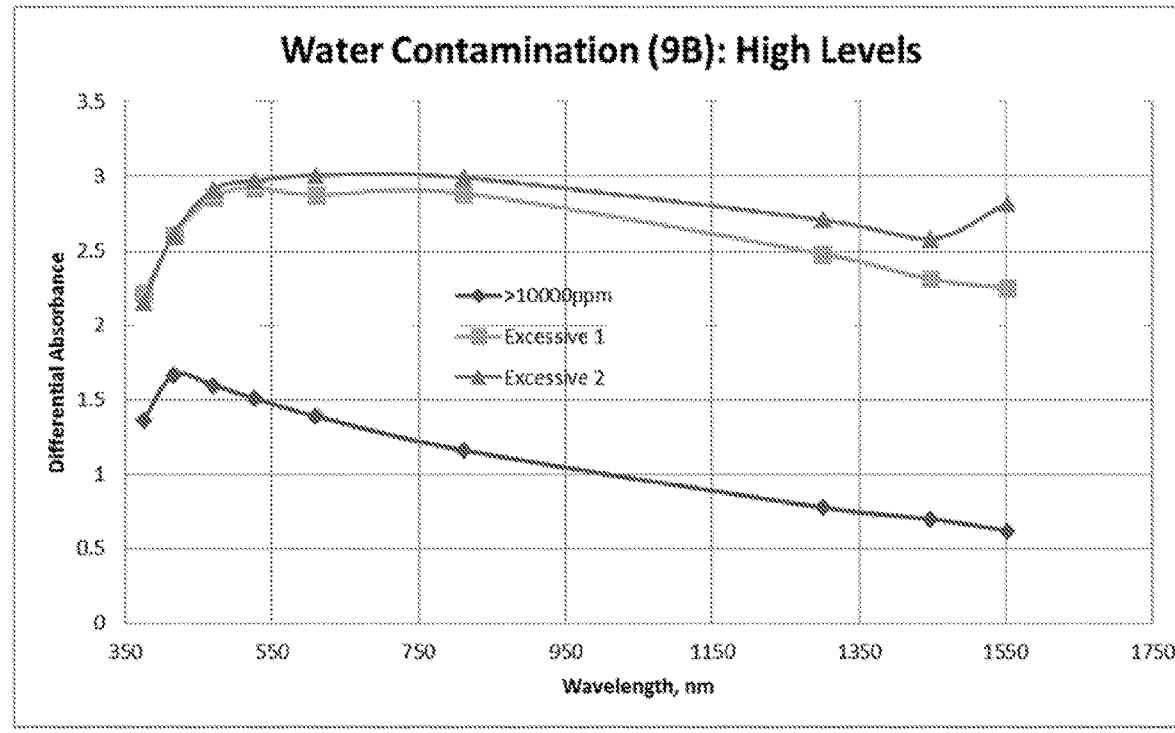
FIG. 16D is a graphical representation of the spectral differential absorbance of gross water contamination of a fluid using a 9-channel sensor of the present invention.

FIGS. 14A-14C show the spectral output for a fluid containing trace amounts of water in the about 100 ppm to about 1000 ppm range. As noted there may be some temperature dependency here where the fluid goes from clear to slightly turbid, as detected by a slight change in baseline, and with the appearance of increased absorption at 1450 nm. FIGS. 15A-15C indicate the sensor output interpolated from digital responses of nine (9) and sixteen (16) LED configurations. In the absence of aging, the solubilized water sensor vector appears as a weak feature at 1450 nm as shown FIGS. 15A and 15B. This weak absorption profile can be detected in the presence of a modest amount of aging as seen in FIG. 15C. As the aging vector increases in intensity the presence of low levels of solubilized water may become less visible, but the increase in aging vector then becomes the more important parameter to monitor. The values in the vector will still provide some indication of the solubilized moisture in the fluid.

Moisture that is detected at the trace levels noted above may be normal and may fluctuate as a function of the operating environment and the operating temperature. In the event that an environmental seal or gasket fails then the level of water contamination can rise to levels described as "gross" contamination. These changed conditions can be detected as indicated in FIGS. 16A-16D. The net change in the spectrum can appear to be similar to the appearance of "insolubles" in the fluid, and at high levels both conditions can indicate a significant failure in the fluid in the hydraulic system, either due to mechanical failure (a leaking seal or severe wear) or significant fluid failure, most likely linked to severe thermal or oxidative stressing of the fluid.

All these conditions are flags or indicators to the need for replacement of the fluid and/or imminent or actual mechanical failure, leading to the need for service or an overhaul. The spectral transitions from a clear fresh fluid to a significantly water contaminated fluid are evident in FIGS. 16A and 16B with the transmittance and absorbance forms of the spectral data. The vector outputs from the sensor give a clear indication of severe or gross contamination with a significant loss in optical transparency caused by a high level of light scattering from the dispersed water. Typically, at this level free water can be observed as droplets when the fluid cools down. This is a catastrophic failure condition and the detection should lead to replacement of the fluid and maintenance of the hydraulic system. The vector and scalar assessments of these conditions are provided in Tables 5-7.

The example vector outputs shown in Tables 5 and 6 can be achieved with either 10 bit or 12 bit devices. The optimum selection allows for the accurate measurement of the transmission close to zero, where a 10 bit A/D will provide 1:1000 accuracy and a 12 bit A/D will provide 1:4000 accuracy. Alternatively, if a standard 16 bit architecture is chosen then an accuracy of 1 part in 64,000 can be achieved. This might not be required and the 12 bit architecture which is common to processors with embedded A/D converters is expected to suffice for all forms of the vector based implementations. However, dependent on the dynamic range required, the raw data in 16-bit format may be preferred to ensure adequate representation of signals close to zero for fluid that have a high absorption due to high levels of dispersed solids or dispersed water A full graphical description of the disclosed sensor concept with a 9 LED implementation is provided in Tables 1 through Table 6. This illustrates the multi-channel LED illumination and detection with the resultant signal acquisition. Six different measurement scenarios are represented in these implementations. In the practical implementation each LED is modulated at either a single frequency or at different frequencies. In the single frequency modulation approach the LED wavelengths are sequentially scanned, for example, from low wavelength to high wavelength and the signals are captured for each block of data. Table 1 illustrates the data collection for the 9-channel LED system with the reference channel collection. Both channels can be captured simultaneously in real-time and when scanned sequentially the light transmission at each wavelength can be acquired. In this example the 9-channel vector output can be generated for each data collection cycle. From this point on all examples discussed will refer to the nine (9) LED channel configuration, producing a 1×9 data array for each vector. This patent disclosure covers all other LED combinations, from more than 1 to a maximum of 50. This maximum is arbitrary, and in practice will be defined by the number of LEDs that are available for the construction of the sensor.

In a real-world system the condition of the fluid is not expected to change very quickly, and so the sequencing the measurement cycle can run every minute, every 10 minutes, or every hour . . . or whatever makes sense for the final implementation. A higher data rate may be required if a temporal separation of the data slices is required, which can be important if there is a high degree of aeration in the system, where micro bubbles can be differentiated on a time basis. In such cases time slicing at about 10 Hz or about 100 Hz rate may be adequate. In the practical implementation the data collection may involve signal averaging where signal responses for each LED are averaged and this is used when there is a need to increase the SNR of the measurement.

In the event that sequential scanning does not provide the required level of differentiation on a time basis then the LEDs can be modulated at different frequencies and all wavelengths can be collected simultaneously. The final spectral vector can be generated by a Fourier transform of the collected modulated signal.

Table 1 provides the signal capture for a fluid with a moderate degree of aging, with 100 hrs lifetime of service. A visual comparison of the optical signals in the sample channel (sample detector signal) versus the reference channel shows the expected attenuated output for the sample for each recorded LED wavelength.

TABLE 1

| Vector output at various wavelengths | | | | | | | | | |
|---|---|---|---|---|---|---|---|---|---|
| Wavelength (nm) | 375 | 416 | 470 | 526 | 611 | 811 | 1300 | 1448 | 1552 |
| Original Transmittance Vector @ 100 hr | 0833 | 0325 | 0431 | 0760 | 0921 | 0957 | 0852 | 0488 | 0805 |
| Differential Absorbance Vector | 0033 | 0441 | 0365 | 0118 | 0028 | 0000 | 0002 | 0003 | 0001 |

The values shown above can be considered as typical for a fluid in service. Note that fresh oil will provide values close to zero for each channel in the "Differential" absorbance mode. This vector represents an inferential measurement of the aging, measured as a differential absorbance from the fresh oil. The computed integrated scalar value for this vector is 70.8 (transmittance) and 0.1 (absorbance) these scalar values may be used to provide a rapid overall screening as an integrated assessment of fluid condition, where values closer to 100 (transmittance) or 0.0 (absorbance) represent excellent oil condition. Values closer to zero (transmittance) or between 2 and 3 (absorbance) indicate a high level of fluid degradation.

Table 2 provides the signal capture for the higher level of aging, as observed for a sample with 200 hr of service. The recorded values for 416 nm and 470 nm are close to a magnitude where the condition may be questioned, where vector values in excess of 1.0 (1000) absorbance, or less than 0.1 (0100) transmittance are indicators of excessive aging. This is an arbitrary scale and the actual limits applied are based on experimentally determined levels from the sensor as applied in a the field with a hydraulic system

TABLE 2

| | Vector output at various wavelengths | | | | | | | | |
|---|---|---|---|---|---|---|---|---|---|
| Wavelength (nm) | 375 | 416 | 470 | 526 | 611 | 811 | 1300 | 1448 | 1552 |
| Original Transmittance Vector @ 200 hr | 0766 | 0192 | 0156 | 0456 | 0775 | 0921 | 0835 | 0478 | 0788 |
| Differential Absorbance Vector | 0069 | 0668 | 0808 | 0340 | 0103 | 0015 | 0011 | 0013 | 0011 |

Table 3 represents the build-up of insoluble or particulate materials and in both cases the vector outputs indicate a system where the fluid needs to be replaced.

TABLE 3

| | Vector output at various wavelengths | | | | | | | | |
|---|---|---|---|---|---|---|---|---|---|
| Wavelength (nm) | 375 | 416 | 470 | 526 | 611 | 811 | 1300 | 1448 | 1552 |
| Original Transmittance Vector for Insolubles Level 1 | 0123 | 0017 | 0003 | 0004 | 0124 | 0367 | 0455 | 0301 | 0506 |
| Differential Absorbance Vector for Insolubles Level 1 | 0540 | 0938 | 1660 | 1431 | 0810 | 0430 | 0240 | 0189 | 0160 |
| Original Transmittance Vector for Insolubles Level 2 | 0022 | 0003 | 0001 | 0001 | 0012 | 0051 | 0149 | 0126 | 0243 |
| Differential Absorbance Vector for Insolubles Level 2 | 1296 | 1706 | 2277 | 2212 | 1819 | 1288 | 0723 | 0566 | 0478 |

Both sets of vectors indicate an unacceptable condition for the fluids with excessive amounts of insoluble/particulate materials. The values for 470 nm and 526 nm are well out of range with values >1000 for the differential absorbance vectors. This should be considered as a trigger point for the 470 nm/526 nm values. The reject condition of these fluids is also reflected in the scalar output for the samples with levels 1 and 2 of insoluble/particulates. The scalar values recorded for these fluids are 21/6.8 (transmittance) and 0.7/1.2 (absorbance), for level 1 and level 2 respectively. In addition to monitoring the 470 nm/526 nm channels, situations where the other channels are above 0200 or even 0100 are also indicators of the appearance of insoluble materials.

The two examples presented in Table 4 represent the detection of high levels of water contamination. When present at lower levels one can expect net increases in the absorbance vectors.

TABLE 4

| | Vector output at various wavelengths | | | | | | | | |
|---|---|---|---|---|---|---|---|---|---|
| Wavelength (nm) | 375 | 416 | 470 | 526 | 611 | 811 | 1300 | 1448 | 1552 |
| Original Transmittance Vector with Water >10000 ppm | 0039 | 0019 | 0025 | 0031 | 0040 | 0066 | 0144 | 0099 | 0194 |

TABLE 4-continued

Vector output at various wavelengths

| Wavelength (nm) | 375 | 416 | 470 | 526 | 611 | 811 | 1300 | 1448 | 1552 |
|---|---|---|---|---|---|---|---|---|---|
| Differential Absorbance Vector with Water >10000 ppm | 1363 | 1666 | 1596 | 1509 | 1390 | 1162 | 0775 | 0697 | 0620 |
| Original Transmittance Vector with Excessive Water | 0006 | 0002 | 0001 | 0001 | 0001 | 0001 | 0003 | 0002 | 0005 |
| Differential Absorbance Vector with Excessive Water | 2208 | 2599 | 2865 | 2918 | 2878 | 2887 | 2481 | 2309 | 2247 |

The vector representations can be evaluated either in the transmittance format with values that range from 1000 (100.0%) to 0000 (0.0%), or in the absorbance format with values ranging from 0000 (0.000 absorbance) to 4000 (4.000 absorbance). Note that absorbance of 4.000 are not necessarily practical, but are a theoretical maximum given that they will be represented by a 12 bit word. In practical terms these values might be truncated to an absorbance of 3.000 (vector value of 3000). There are pros and cons to each format; however, the transmittance value approach sets definable limits of 0 to 100, whereas there is no definable maximum limit to the absorbance value. Although, as noted above, there is a practical maximum and which can be set to 3.000. Also, the transmittance values represent the "Original" spectral output from the fluid, whereas the "Differential" absorbance format for the vector provides a delta function to the net change over all LED channels.

The absorbance value approach has some benefits because the scaling can be equated to increases in material changes. Values close to zero are viewed as having minimum change compared to the fresh fluid, in other words have good condition, and as values increase they transition to progressively poorer condition ratings, lower quality, such as slight, moderate, poor and severe.

The vector output for both "Original" transmittance and "Differential" absorbance are summarized in Table 5 and 6 respectively below for an example of vector assessment of fluid condition for 9-Channel, 9 LED measurement system.

TABLE 5

Original 9-channel Vector Based Fluid Evaluation

| LED wavelength (nm) | 375 | 416 | 470 | 526 | 611 | 811 | 1300 | 1448 | 1552 |
|---|---|---|---|---|---|---|---|---|---|
| Fresh Fluid | 1000 | 1000 | 1000 | 1000 | 1000 | 1000 | 1000 | 1000 | 1000 |
| Used-100 hr | 0833 | 0325 | 0431 | 0760 | 0921 | 0957 | 0852 | 0488 | 0805 |
| Used-200 hr | 0766 | 0192 | 0156 | 0456 | 0775 | 0921 | 0835 | 0478 | 0788 |
| Insolubles-Level 1 | 0123 | 0017 | 0003 | 0004 | 0124 | 0357 | 0455 | 0301 | 0506 |
| Insolubles-Level 2 | 0022 | 0003 | 0001 | 0001 | 0012 | 0051 | 0149 | 0126 | 0243 |
| Water > 10000 pm | 0036 | 0019 | 0025 | 0031 | 0040 | 0066 | 0144 | 0099 | 0194 |
| Excessive Water | 0006 | 0002 | 0001 | 0001 | 0001 | 0001 | 0003 | 0002 | 0005 |

The following discussion of the vector based evaluation of fluid quality is based on a 9-channel version of the sensor (9 LED wavelengths) and for the absorbance format, where values close to zero are indicative of excellent condition and larger values should progressive loss of quality, where a score between 2000 and 3000 are severe or very poor requiring service attention.

TABLE 6

Differential 9-channel Vector Based Fluid Evaluation

| LED wavelength (nm) | 375 | 416 | 470 | 526 | 611 | 811 | 1300 | 1448 | 1552 |
|---|---|---|---|---|---|---|---|---|---|
| Fresh Fluid | 0000 | 0000 | 0000 | 0000 | 0000 | 0000 | 0000 | 0000 | 0000 |
| Used-100 hr | 0033 | 0441 | 0365 | 0118 | 0028 | 0000 | 0002 | 0003 | 0001 |
| Used-200 hr | 0069 | 0668 | 0808 | 0340 | 0103 | 0015 | 0011 | 0013 | 0011 |
| Insolubles-Level 1 | 0540 | 0938 | 1660 | 1431 | 0810 | 0430 | 0240 | 0189 | 0160 |
| Insolubles-Level 2 | 1296 | 1706 | 2277 | 2212 | 1819 | 1288 | 0723 | 0566 | 0478 |
| Water > 10000 pm | 1363 | 1666 | 1596 | 1509 | 1390 | 1162 | 0775 | 0697 | 0620 |
| Excessive Water | 2208 | 2599 | 2865 | 2918 | 2878 | 2887 | 2481 | 2309 | 2247 |

The scale representation of the summation of the transmittance vectors of FIG. 5, in transmittance form and absorbance form (LOG 1/T) are provided in Table 7 as a scalar assessment metric. The intention of the scalar metric is to provide a rapid real-time assessment of fluid condition for quick screening purposes. It is not intended to be a replacement of the "n" channel vector assessment.

TABLE 7

Differential 9-channel Vector Based Scalar Scoring

| | Integrated Signal | % Total Transmission | % Integrated Absorbance |
|---|---|---|---|
| Fresh Fluid | 9000 | 100 | 0.0 |
| Used-100 hr | 6373 | 70.8 | 0.1 |
| Used-200 hr | 5366 | 59.6 | 0.2 |
| Insolubles-Level 1 | 1899 | 21.1 | 0.7 |
| Insolubles-Level 2 | 608 | 6.8 | 1.2 |
| Water >10000 pm | 656 | 7.3 | 1.1 |
| Excessive Water | 23 | 0.3 | 2.6 |

At the simplest level these vectors can be viewed as a 9 Byte word, where each byte is represented by 12bits (e.g. [Byte1][Byte2][Byte3][Byte4][Byte5][Byte6][Byte7][Byte8][Byte9]), or as a simple data array where the net differences for each channel are computed and compared, on a 1:1 basis.

INDUSTRIAL APPLICATIONS

The focus on fluid monitoring devices, as discussed in this patent, is primarily for fluid condition monitoring in automotive, vehicular, and static and dynamic motorized systems that may include engines (combustion, reciprocating, turbines, etc.), motors (electric, hydraulic, pneumatic, etc.), hydraulics, transmissions, gearboxes and differentials, cooling systems (including heat-exchangers and fluid-cooled metal-working, cutting and roller systems). While the above-described embodiments of the present disclosure have been described primarily in the context of hydraulic fluids, it should be understood that the applications of the sensors described herein are not limited to class of fluid, and other types of materials can be considered. This includes lubricants, coolants and fuels.

The present invention can also be applied to various condition assessment and monitoring changes in composition of hydraulic fluids for uses such as: in-service aging; oxidation and thermal stressing; changes in composition of hydraulic fluids as a function of in-service fluid degradation leading to particulates and the formation of insoluble materials; composition of hydraulic fluids as a function of moisture ingress and water contamination; hydraulic fluid condition based on an inferential measurements; measurement of contamination from turbidity; water, air entrainment, particulates and/or other insoluble materials in functional fluids; measurement of oil condition in gasoline and natural gas-fired engines based on the formation of oxidation and nitro-oxidation products; measurement of coolant condition, based on color, composition and turbidity, measurement of marker materials for fluid compatibility, usage and/or condition (color markers added to indicate chemical changes), including fuel markers, among others.

A spectral sensor based on optical transmission measurements at wavelengths defined by an array of multiple LEDs can be used for hydraulic fluid quality and aging monitoring and assessment, moisture and water contamination of fluids, global fluid quality assessment, inferential measurements, and fluid contaminants from turbidity measurements. Based on LED availability the standard ranges for measurements can be between about 350 nm and about 1700 nm. The optical pathlength can be selected based on the application (material type) and wavelength range. The standard selected for common hydraulic fluids is between about 5 cm to about 10 cm total optical path. For hydraulic fluid quality involving the above scenarios, a spectral sensor is based on optical transmission measurements at wavelengths defined by an array of multiple LEDs.

Additionally, the sensor can also be used for monitoring oxidation and nitration products in combustion engines and lubricants using a sensor based on optical transmission measurements with a pathlength defined by the spectral method of measurement. It has been demonstrated that the optical spectrum can model and trend both oxidation and nitro-oxidation in used gasoline and gas-fired engine oils if multiple wavelengths are monitored in the visible and short wave NIR regions. The current disclosure extends these measurements to include the spectral range from about 350 nm to about 1700 nm. As the engine oil ages during service at the elevated temperature of the engine oxidation and nitration products are formed.

Typically, the blended lubricant starts off as pale yellow or straw color, as the aging process proceeds the color darkens and changes from yellow to orange and on to brown, or even black. In this latter case this extreme darkening is often accompanied by the formation of dispersed insoluble material, which can be detected by light scattering light losses. If one records the spectrum the absorption wavelength shifts from the blue to the red end of the spectrum, and eventually into the near infrared (NIR). The aging process may be tracked by monitoring the visible (green, yellow, red) and the NIR wavelengths by means of the selected absorptions at the different wavelengths of the LED emitters. The nitration components may be differentiated from the oxidation products, dependent on the level of nitration, wherein the differences can be determined by experimentation with oils known to have higher levels of nitration.

Additionally, the present invention can be adapted as a sensor for in-line/on-line monitoring of coolant quality in terms of glycol content (diluted and undiluted), water content and also the presence of contaminating fluids. The sensor can also indicate the use of the incorrect grade of coolant. Similarly, different grades of coolant are differentiated by color where long-life and extended life fluids are colored red and yellow, whereas standard grade coolants are typically green. Certain branded coolants are colored alternative colors such as blue and purple. The sensor can discern between the different types and brands of coolant. The different types of lubricant and different classifications of fluids and oils can be color coded. This is a unique sensor for the industry that can classify the type and brand of fluid being used, as well as providing quality and condition assessment.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for fluid measurement, comprising:
   at least one multi-sensing fluid sensor comprising:
     one or more integrated and synchronized light sources, wherein in each light source is configured to produce one or more pre-determined wavelengths of light intensity;
     a detector system, wherein said detector system comprises:
       at least one detector element configured to detect and measure at least one signal intensity of a pre-determined wavelength spectrum of radiation transmitted through the fluid by said light source; and
       coupling apparatus configured to position the detector system and the integrated light source; and
   at least one processing means communicatively coupled to said sensor, wherein said processing means is configured to:
     collect sets of measurement data of the optical spectral measurements carried out by a fluid sensor, wherein said measurement data includes differential transmittance and differential absorbance data of the fluid;
     generate vector outputs from the obtained sets of measurements;
     process the vector outputs to assess the fluid condition;
     translate the vector outputs to a fluid condition assessment; and
     communicate the fluid condition assessment to a user.

2. The system of claim 1, wherein the integrated light source is a plurality of LEDs, wherein the fluid is measured at different wavelengths and the detector system acquires a signal for each wavelength produced by the light source.

3. The system of claim 2, wherein the integrated light source produces light in the spectral region from 250 nm to 2500 nm.

4. The system of claim 3, wherein the light sources are controlled individually and said light sources are modulated at one or more pre-determined frequencies.

5. The system of claim 2, further comprising an analog-to-digital converter configured to scale the measurement data to prevent saturation.

6. The system of claim 1, wherein the detector system is at least one silicon photodiode detector.

7. The system of claim 1, wherein the detector system is at least one InGaAs detector.

8. The system of claim 1, wherein the detector system is a combination of at least one silicon photodiode and at least one InGaAs detector.

9. The system of claim 1, further comprising a fluid temperature sensor communicatively coupled to the processing means, wherein said processing means can normalize potential fluid sensor inaccuracies by correcting the measurement data against a response curve based upon temperature sensitivity data of the fluid stored on a memory.

10. The system of claim 1, further comprising a first light source and a second light source, wherein the first light source is positioned at a first optical angle relative to the sample and the second light source is positioned at a second optical angle to monitor the fluid sample wherein the first optical angle and second optical angles are at different optical angle paths through the sample.

11. The system of claim 10, further comprising at least two optical paths to monitor the sample fluid and a reference fluid under the same conditions, wherein the collection of the measurement data of the first light source and the second light source occurs simultaneously.

12. The system of claim 11, wherein the optical paths are formed by means of a beam splitter to split a single light source into two beams having at least two different optical paths.

13. The system of claim 11, wherein the processing means compares the set of measurement data of the sample fluid and the reference fluid.

14. The system of claim 11, further comprising an optical reference beam that does not pass the fluid sample, wherein said optical reference beam is configured to compensate for drift in any output wavelengths from the light source.

15. The system of claim 11, wherein the processing means compare the set of measurement data of the sample fluid and the reference beam.

16. The system of claim 1, further comprising a memory configured to store the measurement data, historical data, look-up tables, reference data, and vector outputs, and wherein the electronics package is configured to determine a vector value indicative of the light absorbed by the sample, and output at least one vector value indicative of the transmission of light through the fluid via a comparison of the absorption of light of the sample and the absorption of the light of the reference sample.

17. The system of claim 16, further comprising a display, wherein the processing means is configured to generate a message based on one or more vector outputs, and wherein the processing means is further configured to control the display to display the generated message to a user.

18. The system of claim 1, wherein the processing means is configured to be communicatively connected to at least one of remotely located further processing means, controlling means, or displaying means.

19. The apparatus of claim 1, wherein the processing means compares the vector outputs to data references obtained including at least one of the following:
   historical vector outputs,
   look up tables, and
   reference output vectors.

20. The system of claim 19, wherein the measurement data is formed by at least one of an absolute or a differential absorbance measurement.

21. The system of claim 19, wherein the processing means compares the vector outputs to data references generates comparison output vectors, and the processing means generates data indicative of changes from the data reference to the measured fluid data or from different fluid data measurements using the sets of measurements and the comparison output vectors.

22. The system of claim 21, wherein values of the output vectors are indicative of the light absorbed by fluid.

23. The system of claim 1, wherein the system in configured to initiate a measurement cycle at pre-determined intervals and to store one, multiple or continuously generated output vectors of the measurements for the measurement cycle for future reference against the next measurement cycle.

24. A measurement system for fluid condition assessment, comprising:
   at least one fluid sensor comprising:
      an integrated light source configured to produce at least one pre-determined wavelength of light intensity; and
      a detector system, wherein said detector system comprises:
         at least one detector element configured to detect and measure at least one intensity of a pre-determined wavelength spectrum of radiation transmitted through the fluid by said light source; and
         coupling apparatus configured to position the detector system and the integrated light source;
   a memory, comprising stored optical reference data; and
   at least one processing means communicatively coupled to said fluid sensor, wherein said processing means is configured to:
      initiate a fluid condition measurement cycle by the fluid sensor;
      collect sets of measurement data from the fluid sensor, wherein the fluid sensor is configured to measure a first set of data including real-time optical reference data;
      generate vector outputs from the obtained sets of measurements, wherein said vector outputs comprise a measured used fluid vector and a fresh fluid vector;
      generate a differential vector data of the fluid sample based upon the measured used fluid vector and the fresh fluid vector;
      process the differential vector to assess the fluid condition;
      generate differential transmittance data and differential absorbance data from the processed differential vector data;
      analyze the fluid condition based upon the differential vector data; and communicate the fluid condition to a user via a display.

25. The system of claim 24, wherein the system in configured to initiate the measurement cycle at pre-determined intervals and further configured to store the generated vector outputs of the measurements for the measurement cycle for future reference against the next measurement cycle.

26. The system of claim 25, wherein the system can initiate a one or more measurement modes including a differential mode and a comparative mode.

27. The system of claim 26, wherein the integrated lights source comprises a first light source and a second light source, wherein the first light source is positioned at a first optical angle relative to the sample and the second light source is positioned at a second optical angle to monitor the fluid sample, wherein the first optical angle and second optical angle are different optical angles through the sample path.

28. The system of claim 24, wherein the stored optical reference data includes at least one of the following:
   memorized historical vector outputs from one or more previous measurement cycles,
   look-up tables, and
   reference output vectors.

* * * * *